US006327381B1

(12) United States Patent
Rogina et al.

(10) Patent No.: US 6,327,381 B1
(45) Date of Patent: *Dec. 4, 2001

(54) IMAGE TRANSFORMATION AND SYNTHESIS METHODS

(75) Inventors: Peter R. Rogina, Martinsville, NJ (US); Michael Ehrlich, Steamboat Springs, CO (US); David Macintosh, Inverkeithing (GB)

(73) Assignee: WorldScape, LLC, Martinsville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/005,357

(22) Filed: Jan. 9, 1998

Related U.S. Application Data

(63) Continuation-in-part of application No. 08/843,558, filed on Apr. 18, 1997, which is a continuation of application No. 08/365,750, filed on Dec. 29, 1994, now Pat. No. 5,703,961.
(60) Provisional application No. 60/035,159, filed on Jan. 10, 1997.

(51) Int. Cl.[7] .......................................................... G06K 9/00
(52) U.S. Cl. .............................................................. 382/154
(58) Field of Search .................................... 382/154, 153, 382/152; 388/155, 156, 157; 345/419, 421, 425, 427

(56) References Cited

U.S. PATENT DOCUMENTS

| | | | |
|---|---|---|---|
| 3,560,644 | 2/1971 | Petrocelli et al. | 178/6.8 |
| 4,054,881 | 10/1977 | Raab | 343/112 R |
| 4,062,045 | 12/1977 | Iwane | 358/88 |
| 4,103,435 | 8/1978 | Herndon | 35/12 N |
| 4,541,007 | 9/1985 | Nagata | 358/3 |
| 4,571,616 | 2/1986 | Haisma et al. | 358/88 |
| 4,613,866 | 9/1986 | Blood | 343/448 |
| 4,742,356 | 5/1988 | Kuipers | 342/448 |
| 4,757,378 | 7/1988 | Hackett, Jr. et al. | 358/88 |

(List continued on next page.)

FOREIGN PATENT DOCUMENTS

| | | |
|---|---|---|
| 61-125686 | 6/1986 | (JP) . |
| WO 96/21197 | 7/1996 | (WO) . |

OTHER PUBLICATIONS

American Cinematographer: Virtual Camera Movement, vol. 77, No. 9, pp. 93–100 (Sep. 1996).
Ritchey, Kurtis J., *Image Based Panoramic Virtual Reality System*, Simulated Environments, p. 167.
Quinio, Philippe, *A Random Set Approach to 3D Scene Reconstruction by Steroscopic Vision*, Steroscopic Displays and Applications III, p. 173.

(List continued on next page.)

Primary Examiner—Andrew W. Johns
Assistant Examiner—Seyed Azarian
(74) Attorney, Agent, or Firm—Lerner, David, Littenberg, Krumholz & Mentlik, LLP

(57) ABSTRACT

In a telepresence system, a scene is captured by recording pixel data elements, each associated with a pixel ray vector having a direction and an intercept on an known locus in the frame of reference of the scene. Each pixel data element includes data representing the illumination along the pixel ray vector. For example, the pixel data elements may be captured by operating numerous video cameras pointing in different directions on a spherical locus. A virtual viewpoint image representing the image which would be seen from an arbitrary viewpoint, looking in an arbitrary direction, can be synthesized by determining the directions of synthetic pixel ray vectors from each pixel of the virtual viewpoint image through the virtual viewpoint and the intercepts of these vectors on the locus. Recorded pixel data elements having pixel ray vector directions and intercepts close to those of the synthetic pixel ray vector can be copied or interpolated to provide data representing illumination in the synthetic pixel.

11 Claims, 24 Drawing Sheets

U.S. PATENT DOCUMENTS

| | | | |
|---|---|---|---|
| 4,772,942 | 9/1988 | Tuck | 358/87 |
| 4,805,015 | 2/1989 | Copeland | 358/88 |
| 4,858,149 | 8/1989 | Quarendon | 364/522 |
| 4,879,596 | 11/1989 | Miura et al. | 358/88 |
| 4,879,597 | 11/1989 | Barton et al. | 358/88 |
| 4,881,122 | 11/1989 | Murakami | 358/88 |
| 4,928,175 | 5/1990 | Haggren | 358/108 |
| 4,931,817 | 6/1990 | Morioka | 354/113 |
| 4,943,854 | 7/1990 | Shiota et al. | 358/108 |
| 4,943,864 | 7/1990 | Elberbaum | 358/108 |
| 4,952,024 | 8/1990 | Gale | 350/143 |
| 4,957,351 | 9/1990 | Shioji | 350/348 |
| 5,015,188 | 5/1991 | Pellosie, Jr. et al. | 434/38 |
| 5,015,189 | 5/1991 | Wenzinger, Jr. | 434/63 |
| 5,023,725 | 6/1991 | McCutchen | 358/231 |
| 5,049,987 | 9/1991 | Hoppenstein | 358/88 |
| 5,084,763 | 1/1992 | Naradate et al. | 358/88 |
| 5,101,269 | 3/1992 | Shelley et al. | 358/88 |
| 5,109,194 | 4/1992 | Cantaloube | 324/207.17 |
| 5,130,794 | 7/1992 | Ritchey | 358/87 |
| 5,148,310 | 9/1992 | Batchko | 359/479 |
| 5,172,266 | 12/1992 | Garcia et al. | 359/478 |
| 5,187,571 | 2/1993 | Braun et al. | 358/85 |
| 5,268,998 | 12/1993 | Simpson | 395/127 |
| 5,293,529 * | 3/1994 | Yoshimura et al. | 345/158 |
| 5,311,305 | 5/1994 | Mahadevan et al. | 348/169 |
| 5,313,567 * | 5/1994 | Civanlar et al. | 395/124 |
| 5,432,895 * | 7/1995 | Myers | 395/119 |
| 5,475,511 | 12/1995 | Haines et al. | 359/9 |
| 5,553,618 * | 9/1996 | Suzuki et al. | 128/653.1 |
| 5,659,323 | 8/1997 | Taylor | 348/159 |
| 5,703,961 | 12/1997 | Rogina et al. | |
| 6,154,251 | 11/2000 | Taylor | 348/159 |

OTHER PUBLICATIONS

Takahasi, et al., Generation of Intermediate Parallax–Images for Holographic Sterograms, Proc. SPIE vol. 1914 Practical Holography VII (1993).

Johnson, R. Colin, Stairway to Reality, OEM Magazine, Sep. 1994.

Fake Space Labs, *Binocular Omni–Orientation Monitor (Boom)*.

Fake Space Labs, *Molly—A Teleoperated Camera Platform*.

Popular Science, Electronic Panning, Sep. 1992.

* cited by examiner

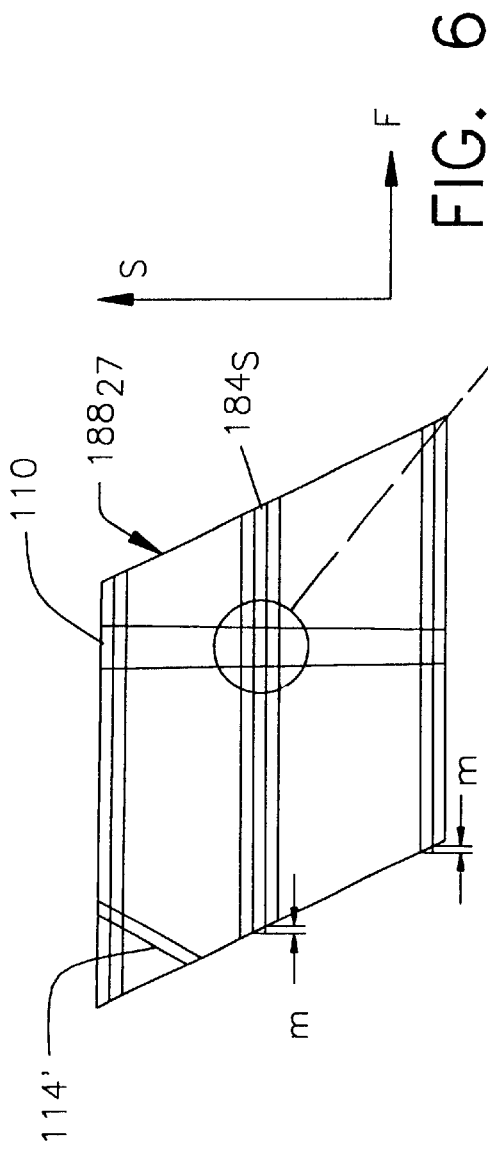
FIG. 6
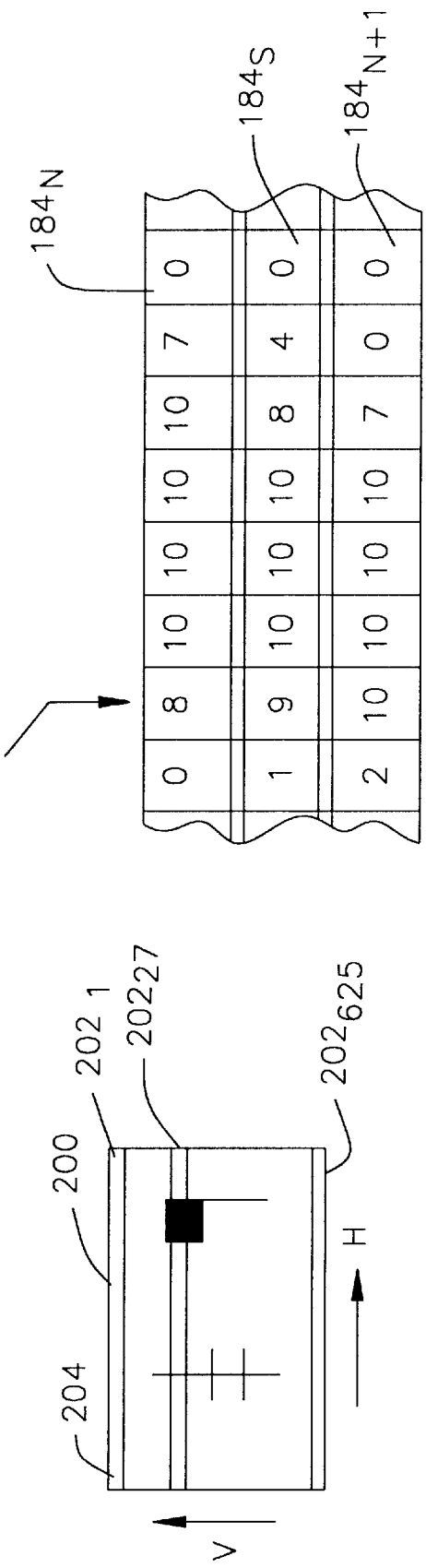
FIG. 9
FIG. 8

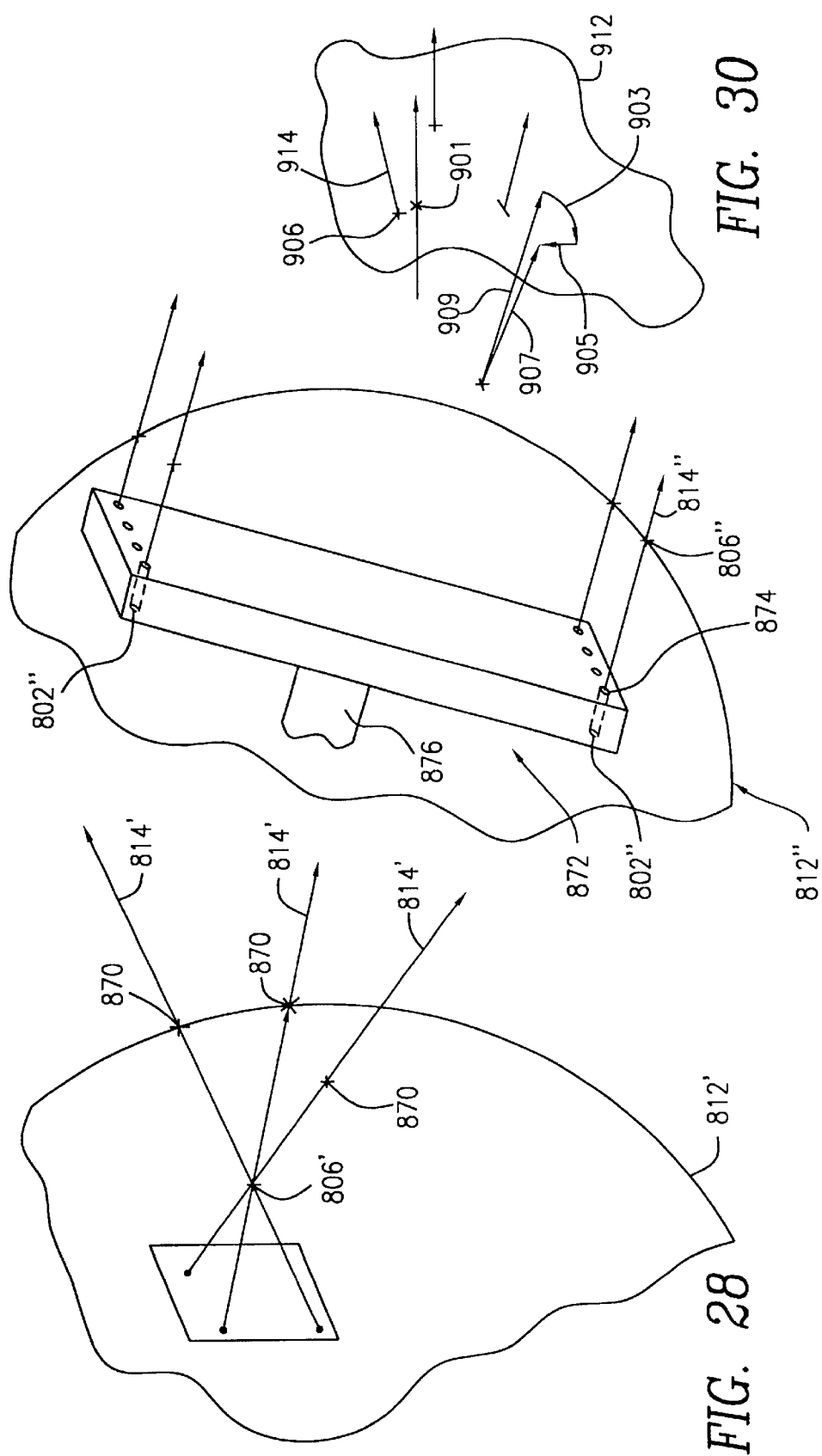

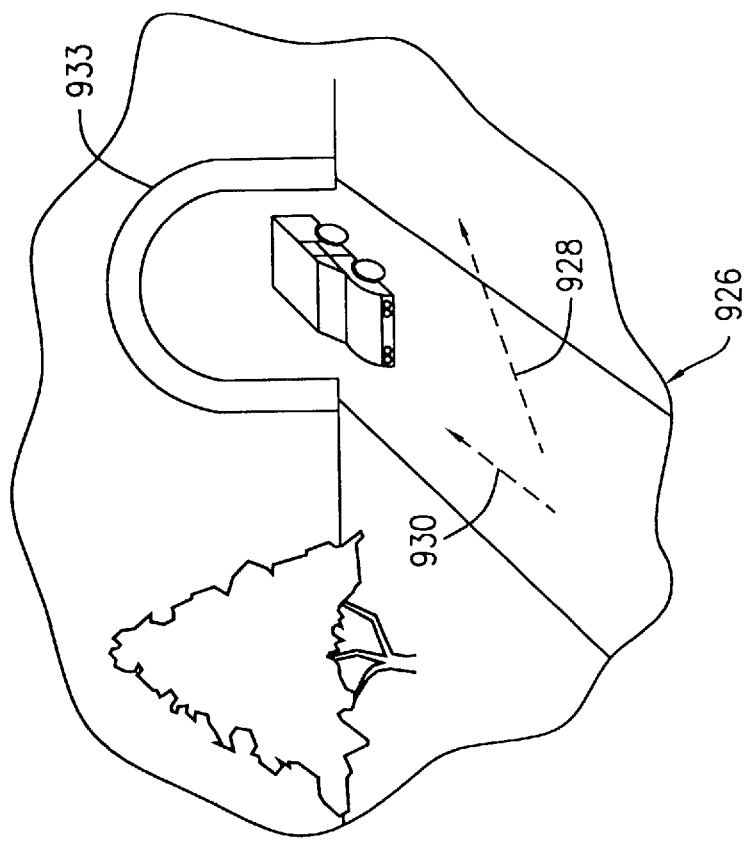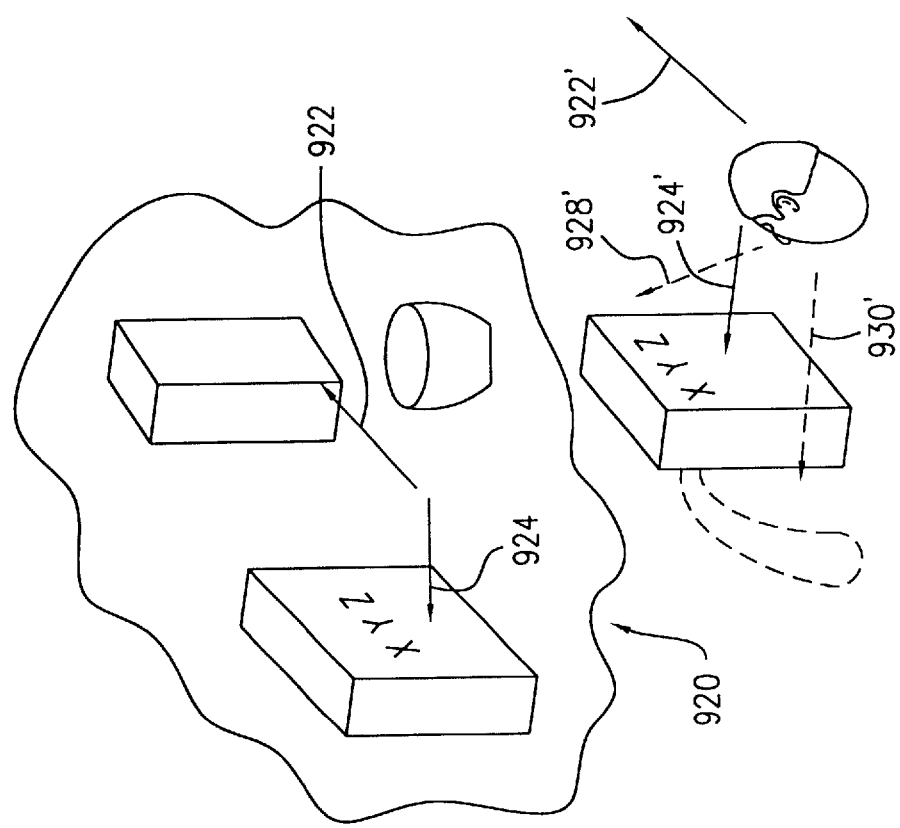
FIG. 31

IMAGE TRANSFORMATION AND SYNTHESIS METHODS

CROSS REFERENCE TO RELATED APPLICATIONS

The present application is a continuation-in-part of U.S. patent application Ser. No. 08/843,558 filed Apr. 18, 1997, which in turn is a continuation of U.S. patent application Ser. No. 08/365,750, filed Dec. 29, 1994, now U.S. Pat. No. 5,703,961. The present application also claims benefit of U.S. Provisional Patent Application No. 60/035,159, filed Jan. 10, 1997. The disclosures of all of the aforesaid applications are incorporated herein by reference.

BACKGROUND OF THE INVENTION

The present invention relates to methods of apparatus for processing pictorial information to synthesize images from arbitrary viewpoints.

Ordinary image display systems such as a common television set or a computer screen with standard image display software provide monocular images from a viewpoint which is independent of the viewer's actual position. When the viewer turns his or her head, the displayed image does not change. Rather, the image continually reflects the viewpoint of the camera which originally generated the video signal or an artificial viewpoint in the image display software. Common systems for displaying stereoscopic images suffer from the same problem. For example, some common stereoscopic vision systems display a separate video image to each eye of the viewer, each such image corresponding to a slightly different camera position or slightly different artificial viewpoint in the case of computer generated images. Here again, however, the viewpoints do not change as the observer moves. Such systems therefore do not provide a truly realistic viewing experience.

Holographic images inherently provide a more realistic viewing experience. A viewer looking at a hologram sees the depicted object from a new viewpoint if he or she moves his or her head to a new location, or turns it to a new viewing angle. In this respect, the experience of looking at a hologram resembles the experience of looking at the depicted objects in reality. However, it is generally impractical to display holographic images of changing scenes. Although some holographic video systems have been demonstrated, they are extremely expensive, require very large bandwidth and suffer from other drawbacks.

So-called "virtual reality" systems can provide viewpoints which move as the observer moves his or her head. Some of these systems display computer generated images synthesized from mathematical models of the scene to be depicted. Such an image involves computation of the projection of the mathematically modeled elements of the scene onto an arbitrary view plane. To provide a stereoscopic view, two different viewing planes are used, corresponding to the slightly different viewing planes of the observers two eyes. Such systems can be provided with detectors for monitoring the actual orientation of the viewer and can be arranged to change the view planes used in the reconstruction as the orientation of the viewer changes. Such an arrangement theoretically can provide an illusion of presence in the scene. However, such systems are limited only to displaying images of mathematically generated scenes. Accordingly, they can only display images of synthetic, computer-created scenes or of real scenes which can be captured and modeled as mathematically tractable elements suitable for handling by computer graphics software. They cannot normally display images of an arbitrary scene. Moreover, such systems require substantial computational power to perform all of the complex mathematical manipulations required. This problem is aggravated where the scene includes moving elements.

An alternative arrangement has been to use an actual camera or cameras directed at the real scene. For a stereoscopic view, two cameras are employed, spaced apart from one another by distance corresponding to the viewer's interpupillary distance. The cameras are mounted on a platform which in turn is linked to a servomechanism. The servomechanism is controlled by a sensor linked to the user's head. As the user moves his or her head, the camera platform duplicates such movement. Accordingly, the images captured by the cameras and transmitted to the user's eyes realistically duplicate the images which the user would see as he or she looks at the scene from any viewpoint. The system can provide a realistic experience of telepresence. The viewer sees essentially the same images as he or she would see if he were at the scene, and these images change in a realistic manner as the viewer's head moves. These systems are expensive, in that a set of cameras and the associated servo mechanisms must be provided for each user. Moreover, these systems require that the scene be in existence and available for viewing at the time the viewer wants to see the scene. They cannot operate with recorded images of the scene. Moreover, there must be continuous, two-way communication between the viewer's location and the real location of the scene, where the cameras are positioned. At least the communications channel from the scene location to the viewer's location must be a high-bandwidth video channel. All of these drawbacks together limit application of such servomechanism based systems to rare situations.

As described in an article by Takahashi et al, Generation Of Intermediate Parallax-images For Holographic Stereograms, Proceedings SPIE, Volume 1914, Practical Holography VII (1993) a so-called "Holographic Stereogram" can be synthesized from numerous individual monocular images of a scene, typically about 50 to 100 such images. To alleviate the need for actually capturing so many real images, the authors propose to generate intermediate images by projection back from three dimensional data defining the scene. The three dimensional data, in turn, is calculated from the images taken by real cameras at various locations on a linear camera locus. In this manner, the system is able to create intermediate images simulating the image which would be taken by a camera positioned between positions of real cameras. This system depends upon two-dimensional projection from three-dimensional data; i.e., calculation of the image which would appear in a viewing plane based upon data defining the location of objects in the scene in three dimensions. The system must determine the depth from the real cameras of each point in the scene.

To facilitate this determination, the authors propose to use certain characteristics of a so-called "epipolar image". As further described below, an epipolar image combines data from multiple cameras into partial images, each including part of the data from each camera. With conventional raster-scan video cameras, each portion of the epipolar image typically includes one scanning line from each camera of the multiple camera set. In such epipolar images, features appear as sloping strips or bands. The width and slope of the bands are related to the depth or distance between the actual feature and the camera locus. Moreover, it is possible to determine from the epipolar image which features in the scene occlude other features, i.e., which features lie to the front, closer to the cameras and in which features lie to the back. The authors thus propose to recover the depth of the various points in the image by using the epipolar image. That depth information, in turn, is used as part of three-dimensional data, which in turn is used to project a two-dimensional image simulating the two-dimensional image which would be captured by a camera at an intermediate location. This system nonetheless involves all of the computational complexity required to reconstruct two-dimensional images from three-dimensional images. Moreover, Takahashi et al characterize their system only as suitable for generation of the stereographic holograms, and not for generation of images to be viewed directly by a viewer.

Accordingly, despite all of this effort in the art, there still remains a substantial, unmet need for improved methods of synthesizing and displaying an image of a scene from an arbitrary, synthesized viewpoint. In particular, there are substantial, unmet needs for improved methods of providing telepresence, including display of images from different viewpoints as the users head moves in real time. In particular, there are needs for a telepresence system which can provide images to multiple users simultaneously.

SUMMARY OF THE INVENTION

The present invention addresses these needs.

One aspect of the invention provide methods of synthesizing an image of a scene corresponding to the image of said scene which would be observed from a virtual viewpoint location. The method includes the step of providing a plurality of starting pixel data elements. Preferably, each said starting pixel data element incorporates data corresponding to illumination seen along a starting pixel ray vector associated with that starting pixel data element. Each said starting pixel ray vector desirably has a direction and an intercept on a known locus in the frame of reference of the scene. The direction of a synthetic pixel ray vector from the pixel through the virtual viewpoint location, and the intercept of the same vector on the locus are determined. The idea of a synthetic pixel ray vector can be envisioned by imagining a camera having its lens at the virtual viewpoint. A vector from a given pixel in the image plane of the imaginary camera would correspond to a synthetic pixel ray vector for that pixel. Using the direction and intercept of the synthetic pixel ray vector, one or more starting pixel data elements are selected. The selected starting pixel data elements are those associated with starting pixel ray vectors having directions and intercepts close to the direction and intercept of the synthetic pixel ray vector. The method further includes the step of deriving synthetic pixel data for the pixel of the synthesized image from the starting pixel data of the selected starting pixel data element or elements. Where only one starting pixel data element is selected, the data of that element can simply be copied as the data of the synthetic pixel. Where plural starting pixel data elements are selected, the step of deriving the synthetic pixel data typically includes the step of interpolating between the data of the selected starting pixel data elements.

In a particularly preferred arrangement, the step of providing starting pixel data elements includes the step of providing a plurality of direction matrices. Each direction matrix includes starting pixel data elements associated with pixel ray vectors having directions parallel, within a preselected direction tolerance range, to a common direction. The step of selecting one or more starting pixel data elements for each synthetic pixel desirably includes the steps of selecting one or more of said direction matrices having a common direction close to the direction of the synthetic pixel ray vector and selecting those pixel data elements from the selected direction matrices which are associated with starting pixel ray vectors having intercepts close to the intercept of the synthetic pixel ray vector on the locus.

Stated another way, the step of providing starting pixel data elements desirably includes the step of ordering the starting pixel data elements in a multidimensional matrix having at least one dimension correlated with direction of the starting pixel ray vectors and at least one dimension correlated with the intercepts of said starting pixel ray vectors. The locus used as the frame of reference for the intercepts may be two-dimensional, such as a sphere or portion of a sphere having an azimuth or longitude direction and also having an elevation or latitude direction. In further methods according to this aspect of the invention, the step of providing starting pixel data elements includes the step of providing a plurality of discrete two-dimensional images corresponding to the image of a scene observed from a plurality of discrete viewpoints. Preferably, the viewpoints lie on the aforementioned locus. Each discrete image includes pixel data elements associated with pixels offset from one another in horizontal and vertical directions within that discrete image. The pixel data element associated with each pixel in a discrete image represents illumination seen along a starting pixel ray vector from that pixel through the viewpoint of that discrete image.

A further aspect of the invention provides methods of providing data defining an image of a scene. Methods according to this aspect of the invention desirably include the step of providing a plurality of starting pixel data elements. Here again, each starting pixel data element incorporates data corresponding to illumination seen along a starting pixel ray vector associated with that starting pixel data element. Each starting pixel ray vector has a direction and an intercept on a locus. The method further includes the step of forming the starting pixel data elements into a transform image including a plurality of direction matrices, each said direction matrix including pixel data elements associated with pixel ray vectors having directions parallel within a preselected direction tolerance range to a common ray direction. Within the transform image, the direction matrices can be provided in an ordered array so that the common ray direction of each direction matrix is implicit in the position of such direction matrix in said ordered array. Likewise, individual pixel data elements can be ordered within the direction matrix so that intercept of the pixel ray vector associated with each pixel data element is implicit in the position of that pixel data element in the direction matrix. One or more lookup tables may be provided to relate positions of pixel data elements in direction matrices to intercepts of pixel ray vectors, or to relate positions of direction matrices within the transform image to ray direction of the associated pixel ray vectors. The transform images provided according to this aspect of the invention can be used in the image synthesis methods discussed above.

The step of providing the pixel data elements desirably includes the step of actuating a plurality of pixel sensing elements receiving illumination directed in different physical sensing directions so that a set of pixel sensing elements receiving illumination in substantially parallel physical sensing directions are actuated concomitantly with one another to capture pixel data elements constituting each said direction matrix. In one arrangement, different sets of pixel sensing elements are actuated in order of the physical sensing directions of said sets, so that the physical sensing direction is scanned in a progressive sweep. The pixel sensing elements can be provided in a plurality of different arrays, such as in a plurality of cameras. The step of actuating the pixel sensing elements can be conducted so that the set of pixel sensing elements actuated concomitantly with one another to capture the pixel data elements constituting each direction matrix includes pixel sensing elements in a plurality of cameras. As further discussed below, the simple transposition from data acquired by pixel sensing elements to data elements within matrices lends itself to simple system architecture and rapid data acquisition.

The method may include the step of repeating the aforesaid steps so as to capture a time sequence of transform images representing a time sequence of scenes, i.e., a scene which changes with time. Also, the method may further include the step of compressing the data in a transform image to provide a compressed transform image. For example, the compressing step may include the step of comparing a plurality of direction matrices with one another, i.e. These methods can be used in providing telepresence. In a telepresence system, the step of selecting a virtual viewpoint includes the step of detecting the disposition of an observer, typically by detecting both the viewpoint or location of the observer and the viewing direction of the observer as the observer moves and selecting the virtual viewpoint so as to correspond to the viewpoint of the observer. Also, in a telepresence system, the method further includes the step of displaying the virtual viewpoint image to the observer substantially in a real time. That is, the steps of detecting the disposition of the observer, synthesizing a virtual viewpoint image and displaying that image are performed substantially in real time, as the observer moves, so that the observer sees the correct virtual viewpoint image for a new observer disposition as substantially immediately as the observer moves to the new disposition. For stereoscopic images, two virtual viewpoint images are generated for each observer disposition, these images being taken from slightly different virtual viewpoints corresponding to the dispositions of the observer's eyes.

In methods according to the foregoing aspects of the invention, there is no need to reconstruct the full or there-dimensional scene, or to calculate a projection from full three-dimensional scene-specifying data onto a two-dimensional image plane. Indeed, as further discussed below, the manipulation of pixel data required to construct the virtual viewpoint image preferably includes only simple mapping of pixel data with some linear combinations or interpolations of pixel data. These steps can be carried out rapidly even where the images to be handled include large amounts of data as encountered in common video images. The system does not require any mathematical modeling or knowledge of the elements in the scene to be depicted. The starting pixel data can depict any scene, whether computer-generated or taken by a real cameras or some combination of the two. The starting pixel data need not be captured in real time during viewing. The data may be prerecorded in its original form, such as in discrete images or prerecorded in transform images. Further, the scene need not be static. Thus, the starting pixel data may be provided as sets, each such set incorporating pixel data captured at. a given instant A separate transform image may be created for each such set, so as to provide a data set for a time series of scenes. Here again, the step of creating the transform images need not include any complex, three-dimensional projection, but may instead may include simple concatenation of pixel data. Thus, methods according to this aspect of the present invention can be applied to provide telepresence in a dynamic environment, i.e., the illusion that the observer is actually present in a time series of scenes including moving objects. The observer sees both motion of the objects and apparent motion caused by movement of his or her viewpoint.

Still further aspects of the invention provide methods of modifying a data set, defining a first scene or time sequence of scenes, such as a transform images or series of images as discussed above, so as to provide an altered scene or altered time sequence of telepresence scenes. The method may include the step of altering the data in said set defining said first time sequence so that the alteration changes progressively. As further discussed below, the alteration may initially affect only a small number of pixel data elements, and hence may affect only a small region of the observer's environment in a telepresence system. The number of pixel data elements affected by the alteration may be increased progressively in later scenes of the sequence so that the alteration appears to may spread progressively to a larger region. The direction matrix data structure discussed above facilitates this progressive alteration. Alternatively or additionally, the degree of alteration of particular pixel data elements, or of all of the pixel data elements in a scene may increase progressively. For example, all of the pixel data elements may vary progressively from the data associated with one scene or sequence of scenes to the data associated with another scene or series of scenes. According to further aspects of the invention, the output image displayed to the observer may be altered progressively. According to still other methods, the data defining discrete images used as input to the methods discussed above may be altered.

A further aspect of the present invention incorporates the realization that data arranged in the transform images discussed above can be compressed and stored or transmitted in compressed form, and then subsequently decompressed for use in image synthesis steps as described above. It is advantageous to store and transmit the data in the form of compressed transform images, such, and then decompress the transform images.

These and other objects, features and advantages of the present invention will be more readily apparent from the detailed description of the preferred embodiments set forth below, taken in conjunction with the accompanying drawings.

BRIEF DESCRIPTION OF THE DRAWINGS

FIGS. 5 and 6 are schematic representations of line sets utilized in operation of the system.

FIG. 8 is a view similar to FIG. 4 but depicting a virtual viewpoint image as created by the system.

FIG. 9 is a chart depicting, on an enlarged scale, a portion of the line set depicted in FIG. 6.

FIGS. 28, 29 and 30 are fragmentary diagrammatic views depicting certain elements used in methods according to further embodiments of the invention.

FIG. 31 is a further diagrammatic view depicting certain scenes and images in a method according to yet another embodiment of the invention.

DETAILED DESCRIPTION OF THE PREFERRED EMBODIMENTS

Figure 1:
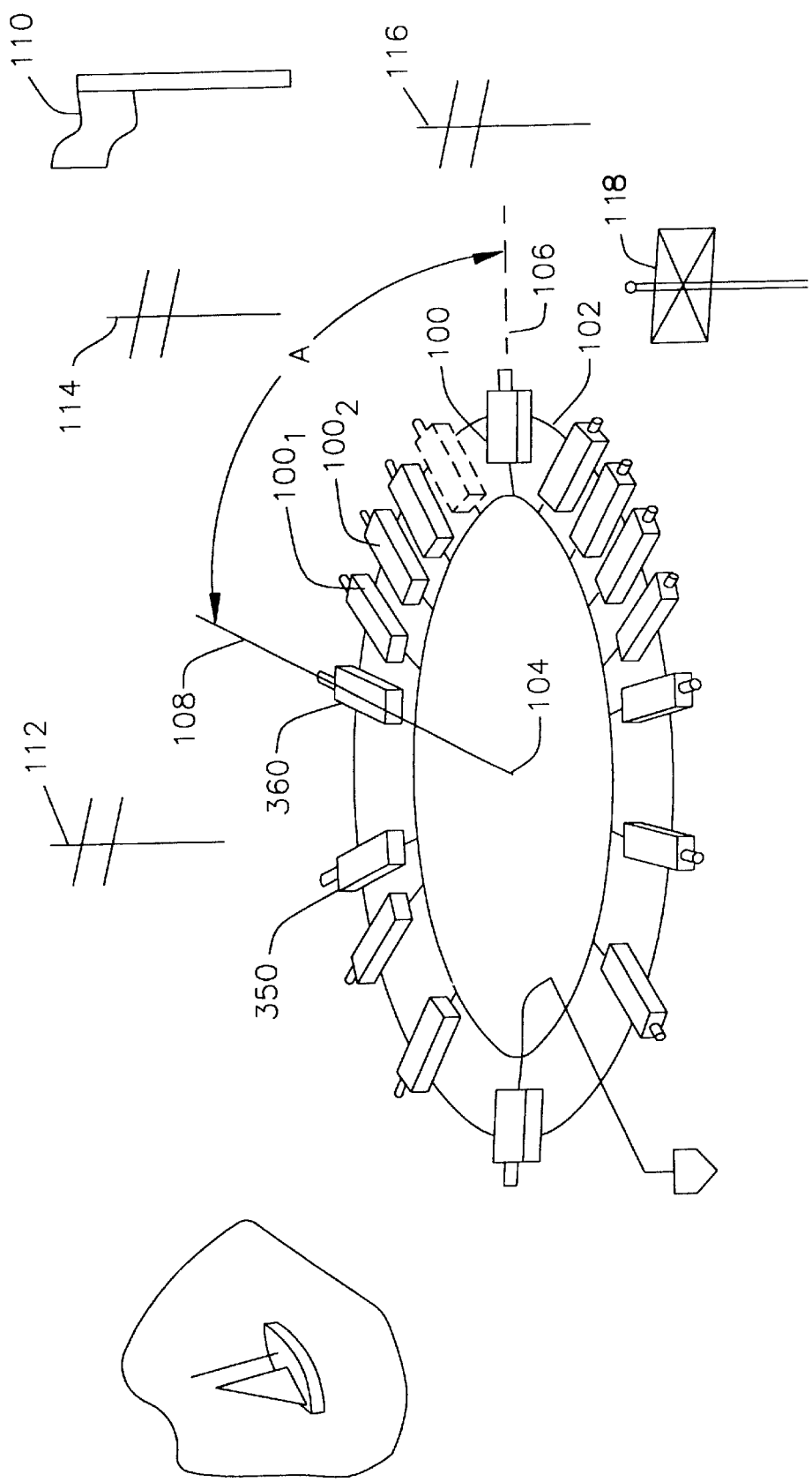
FIG. 1 is a diagrammatic, perspective view showing portions of a system in accordance with embodiment of the invention in conjunction with a real scene to be depicted.

Apparatus in accordance with one embodiment of the present invention includes a plurality of video cameras 100 arranged on a horizontal curvilinear locus 102 which in this embodiment is a circle having a center of curvature 104. The cameras are arranged so that each camera 100 points substantially radially outwardly away from center 104. That is, the optical axis 106 of each camera is a radial line passing through the center 104, and so that the lens of each camera is positioned at the same radial distance from the center. Each of cameras 100 is positioned at a different viewpoint. Each viewpoint may be denoted by a viewpoint location from an index or zero degree reference line 108. As illustrated, 360 individual video cameras are provided, one per degree, around the entire periphery of circle 102. Each camera 102 may be essentially any type of video camera as, for example, a conventional raster-scanning image tube type or a solid state type such as a CCD. As further discussed below, the images captured by the cameras will ultimately be converted to pixel data representing pixels in horizontally oriented lines. For that reason, it is preferred to provide the cameras so that the real elements constituting the raster lines of the camera are already aligned in the horizontal direction, i.e., parallel to the plane of locus 102. Alternatively, each image can be rotated about the axis of the camera using conventional, well-known video processing techniques, to provide the image restated in a series of horizontal lines. All of cameras 100 are synchronized, so that each camera captures a frame at the same time. As illustrated in FIG. 1, the camera set is capturing a real scene, including objects such as a flag pole and flag 110, utility poles 112, 114 and 116 and sign post 118. These and other objects may entirely surround the camera array, and include moving objects as well as still objects.

Figure 2:
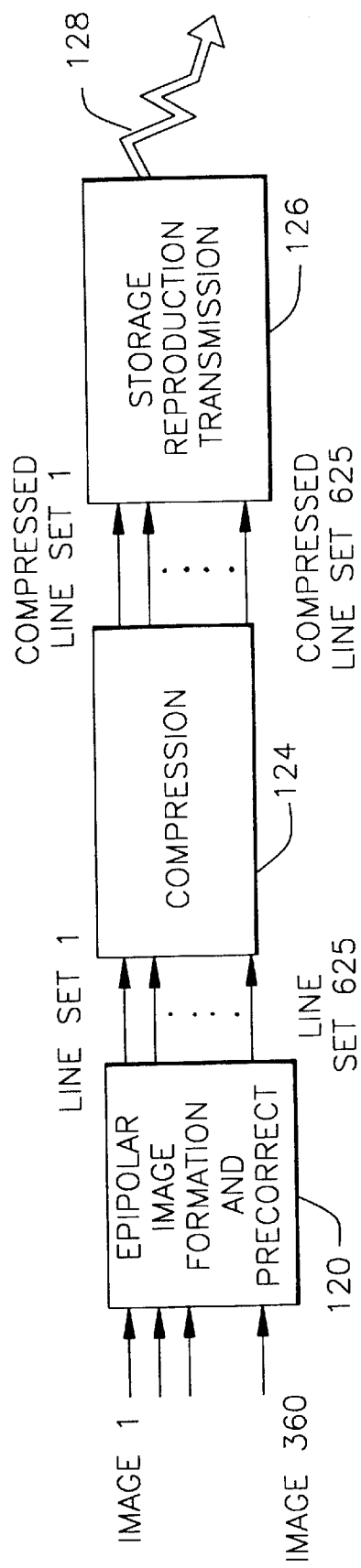
FIG. 2 is a functional block diagram depicting further portions of the system of FIG. 1.

Cameras 100 are connected to a precorrection and epipolar image formation unit 120 (FIG. 2), so that each camera 100 feeds an individual image into this unit. Unit 120 is arranged to correct each of the individual images and then to transform the group of images into an epipolar image comprising a series of line sets as discussed below. Each including some of the information from each one of the incoming images.

Unit 120 is connected to a compression unit 124. Unit 120 feeds each of the line sets to the compression unit. Compression unit 124 incorporates apparatus for compressing two-dimensional images using standard techniques commonly applied to standard video images. Such techniques can be applied directly to the line sets produced by units 120. The compression unit 124 is connected to storage, reproduction and transmission unit 126. This unit may incorporate any available form of equipment for storing, reproducing or transmitting data such as, for example, equipment for modulating the data onto a suitable carrier and broadcasting it or transmitting it through wire or fiber optic links, or equipment for recording the data on conventional media such as magnetic or optical storage media. Unit 126 treats each of the compressed line sets received from compression unit 124 independently.

Figure 3:
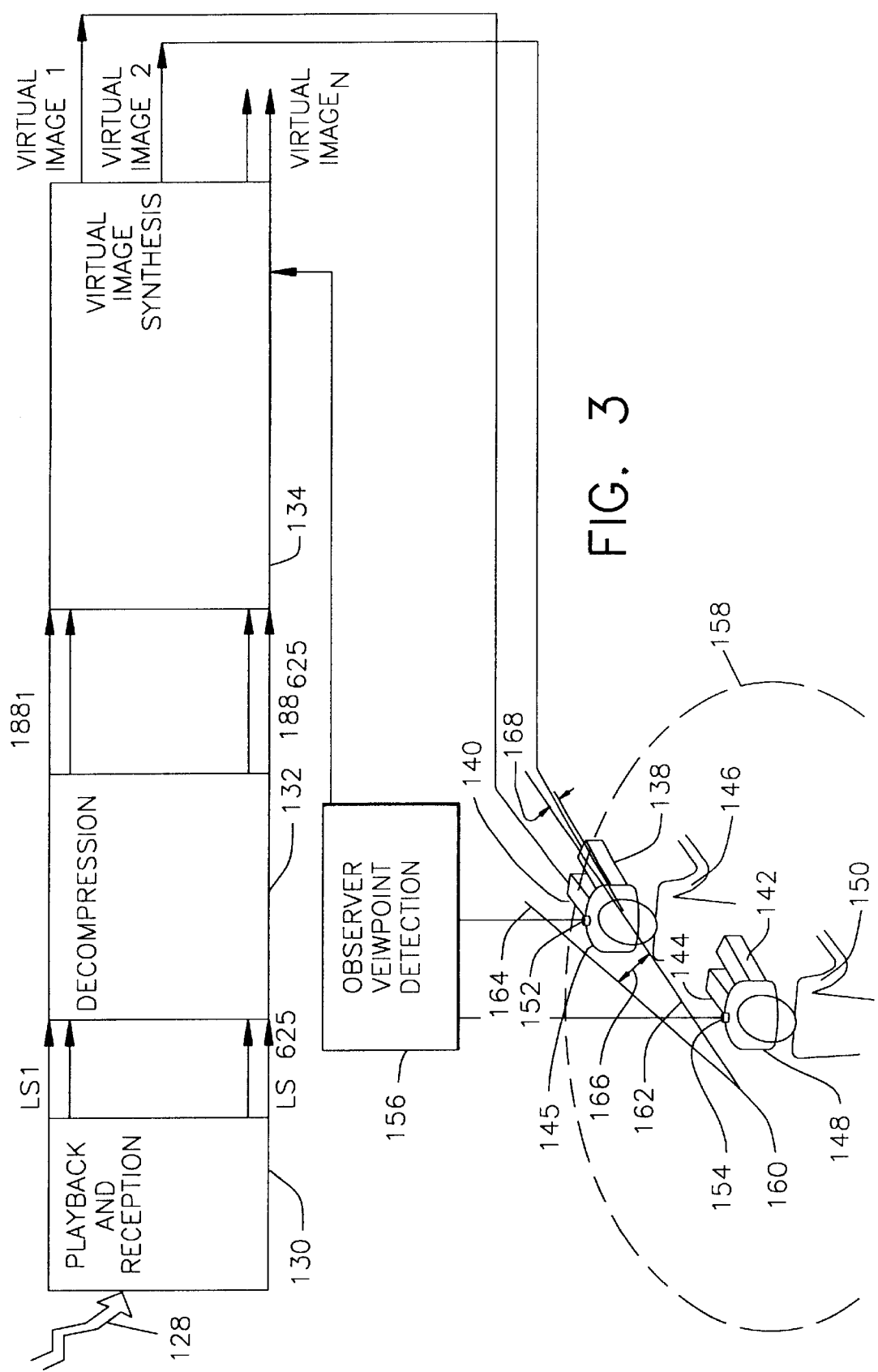
FIG. 3 is a further functional block diagram depicting still further portions of the same system in conjunction with observers.

Unit 126 is linked via a one-way communications channel 128 to reception and playback unit 130 (FIG. 3) adjacent the location of observers who will view the images produced by the equipment. Communications channel 128 need only provide one-way communication of the compressed line sets; it need not provide instantaneous communications. For example, where the compressed line sets are recorded by unit 126 on media such as tapes or disks, communications channel 128 may include distribution of the physical media by conventional channels as, for example, sale of the same in stores. Alternatively, communications channel 128 can be arranged for substantially instantaneous, real time transmission of the compressed line sets as, for example, in a conventional broadcast, cable or fiber channel. Also, although only one playback and reception unit 130, and only one group of associated equipment is illustrated in FIG. 3, it should be appreciated that any number of such playback and reception units, and the associated components discussed below, can use the same data from unit 126 either simultaneously (where the communication channel operates instantaneously), or at different times (where the channel provides delay, such as distribution of recorded media).

Playback and reception unit 130 is arranged to recover data from communications channel 128 as, for example, by demodulating broadcast or cable signals or playing back recorded media, so as to provide the line sets in compressed form, substantially as provided by compression unit 124. Here again, each line set is handled independently. Decompression unit 132 is arranged to reverse the compression applied by compression unit 124 to each line set. Here again, the conventional techniques used to process ordinary two-dimensional video images can be employed. Compression unit 132 provides the decompressed data representing the line sets to a virtual image synthesis unit 134.

The system further includes display devices 138, 140, 142 and 144. As illustrated, display devices 138 and 140 are incorporated in a helmet or goggles unit 145 which can be used by an observer 146, the display devices 138 and 140 being arranged to display their respective images to the two eyes of the observer 146. Likewise, display devices 142 and 144 are mounted to a helmet unit 148 which is worn by an observer 150. Devices 142 and 144 are arranged to display their respective images to the right and left eyes of the observer, respectively. The display devices and helmets may be conventional units of the type employed for so-called "virtual reality" displays. Typically, these include small cathode ray tubes or active matrix displays mounted to the helmet, with appropriate eye pieces linking each such display to the eye of the observer.

Helmet unit 145 includes a magnetic locating transmitter 152, whereas unit 158 includes a similar magnetic locating transmitter 154. The system further includes an observer viewpoint detection unit 156. The observer viewpoint detection unit detects the magnetic fields from transmitters 152 and 154 and determines the positions and orientations of each of the helmet units 145 and 148. Magnetic location and orientation detection systems per se are well-known, and are used, for example, in virtual reality systems and in systems for detecting the position and orientation of a pilot's helmet in military aircraft applications. Examples of such detection systems include those described in U.S. Pat. Nos. 4,613,866; 5,109,194 and 4,054,881. Any other operable location and orientation detection system, such as an optical, mechanical or electromechanical system can be used instead of the magnetic system. Viewpoint detection unit 156 provides a signal to virtual image synthesis unit 134 representing the viewpoint of each of display devices 138, 140, 142 and 144. This viewpoint signal is derived from the location and orientation of the associated helmet 145 or 148, and from information concerning the position and orientation of each display device with respect to the associated helmet. Thus, the viewpoint for display device 140 will differ from that for display device 138, this difference corresponding to the difference in viewpoints of the observer's two eyes. However, these two viewpoints will change in unison as observer 146 moves or turns. Likewise, the viewpoint for display device 142 and 144 will differ from one another, but viewpoints 142 and 144 will change in unison as observer 150 moves and turns.

The observer viewpoint signals provided by unit 156 denote each viewpoint as position and orientation of the observer associated with each display device, i.e., the position of the observer's eye, in terms of an observer locus 158 corresponding to the real locus 102 that was originally used for cameras 100. Thus, each viewpoint is provided in terms of observer viewpoint radius from an observer center point 160, to the eye of the observer and an observer viewpoint angle 166 from an observer index line 164 corresponding to the index line 108 of the real camera locus. Also, the observer viewpoint detection unit determines an observer step angle 168 between the optical axis of the observer's eye and the radius from center point 160 to the eye. This angle is determined based upon the position of the observer's head, from the movements of helmet 145 as reported by magnetic transmitter 152. If desired, the system can also incorporate devices for detecting movements of the eye relative to the head, also called "pupillary tracking" devices, to provide an even more accurate eye position.

As further described below, virtual image synthesis unit 134 converts the line sets received from compression unit 132 into virtual images for display by each of the display devices. Thus, a first virtual image will be fed to display device 140 whereas the second, different virtual image will be fed to display device 130 and still other virtual images will be passed to display devices 142 and 144.

Figure 4:
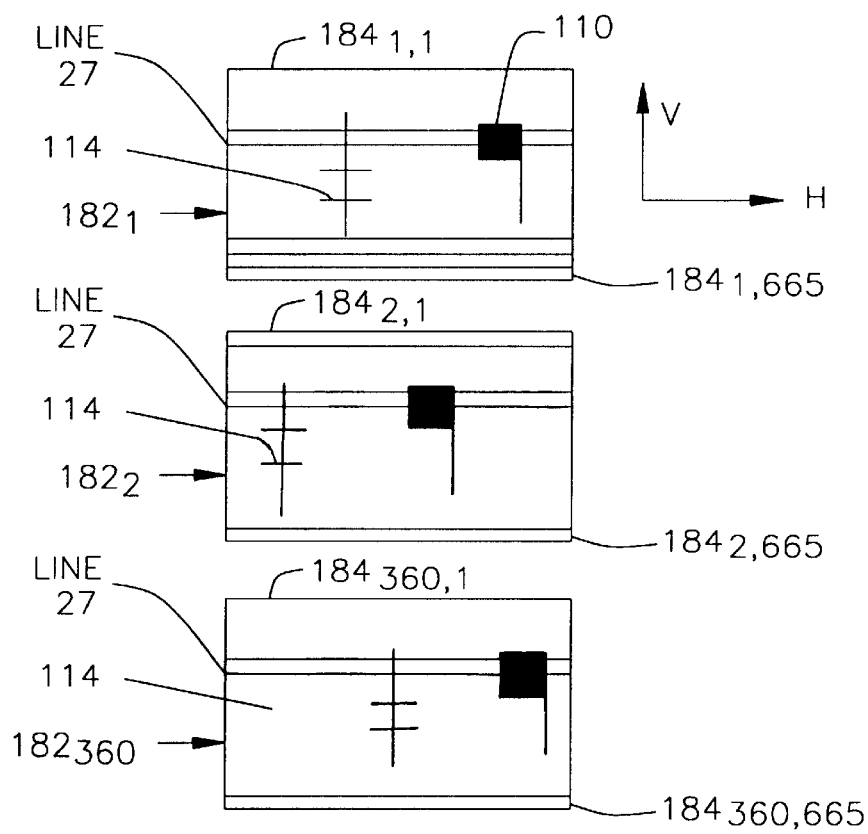
FIG. 4 is a schematic representation of several discrete images as initially captured by the system.

In operation, each camera 100 captures a conventional, two-dimensional video image of the scene. As indicated in FIG. 4, each video image includes pixels in a two-dimensional array, including a first or horizontal image direction H and a second or vertical image direction V. As best appreciated with reference to FIG. 7, the position of each pixel in the first or horizontal direction H represents the offset angle B between the optical or view axis 106 of the image (the viewing axis of the camera which captured the image) and a ray 180 from an object in real space to the particular pixel. Ray 180 is also referred to herein as a pixel ray vector. Stated another way, the horizontal or first image dimension represents a real dimension of the viewed scene, namely, the offset angle or angular displacement of the object represented in a particular pixel from the optical axis 106 of the camera. Similarly, the location of any pixel in the image represents the vertically directed offset angle (not shown) between the optical axis 106 and the ray from the real object represented by the pixel. Thus, as shown in FIG. 4, image $182_1$, from camera $100_1$ includes conventional representations of light and dark objects on a two-dimensional field, representing a projection of the real, three-dimensional image onto an image plane perpendicular to optical axis $106_1$ of camera $100_1$.

In FIG. 4, and in the succeeding figures, the images are shown as pictorial images, i.e., relatively dark areas in the real scene being shown as dark areas in the image and so on. This representation is used solely for ease of understanding. In fact, the video images produced by the cameras incorporate electronic signals representing the optical qualities of the various pixels in the standard manner of video signals. The particular optical qualities will vary with the type of video images. In a monochrome system, each pixel may have associated with it only a single analog signal level or digital number representing brightness. In a color system the data for each pixel may include analog or digital values for several parameters, such as luminance and a pair of chrominance parameters, or else may include separate primary color brightness signals such as red, green and blue. In the conventional fashion, the pixels constituting each image are arranged in lines, the lines extending in the first image direction. For example, image $182_1$ includes 625 pixel lines extending in the first image direction, the first such pixel line $184_{1,1}$ representing the top of the image and the last such pixel line $184_{1,625}$ representing the bottom of the image. Likewise, the image from viewpoint or camera $100_2$ includes a similar array of pixel lines starting with top pixel line $184_{2,1}$ and ending with bottom pixel line $184_{2,625}$ and so on, through the image from 360th camera or viewpoint $182_{360}$, which include pixel lines $184_{360,1}$ through $184_{360,625}$.

The real physical components utilized to provide images $182_1$ through $182_{360}$ ordinarily suffer from some distortion. That is, the first image dimension or horizontal image dimension H may not exactly represent the offset angle B (FIG. 7) ray and the optic axis 106 and the vertical dimension may not exactly represent the vertical rear angle. Unit 120 (FIG. 2) is arranged to apply standard distortion correcting techniques to substantially remove these effects. As is well known in the video processing arts, a distorted image can be corrected by applying an appropriate mathematical mapping. Based upon prior knowledge of the distortion, the data from the various pixels is remapped so that the data originally included in a particular pixel of the distorted image is transposed into a different pixel in the corrected image. Image correction techniques of this nature are well-known in the standard video arts, and hence are not further described herein. Unless otherwise indicated, references herein below to images 182, or to the pixels from such images, should be understood as referring to the corrected versions.

Figure 5:
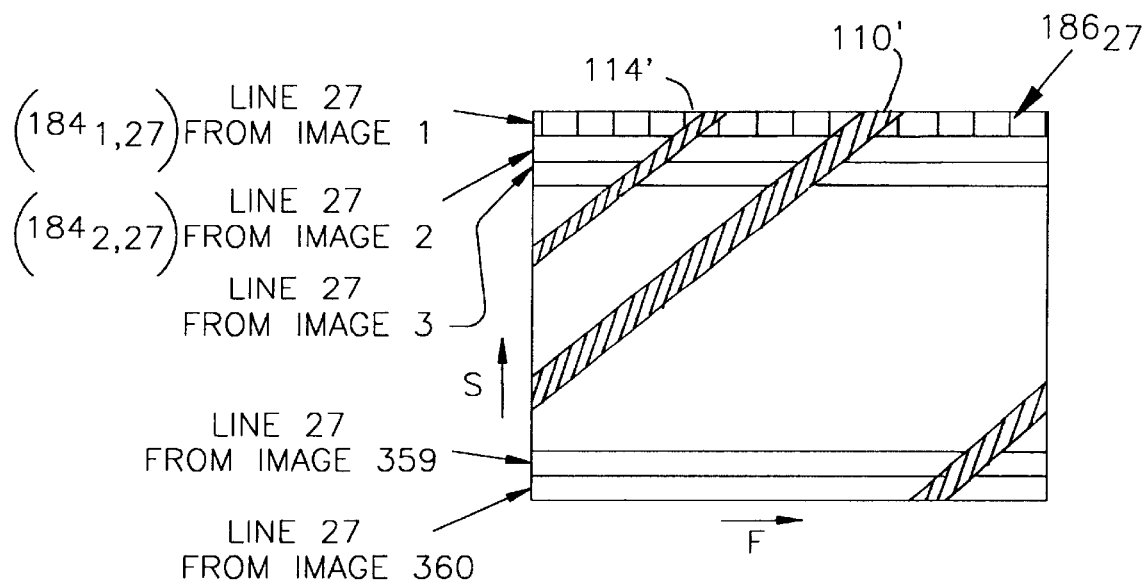

After distortion-correcting each of images 182 captured by cameras 100 at a particular time, epipolar image unit 120 reorders the data in all of these images 182 into an epipolar image incorporating a number of line sets. One such line set 186 is depicted schematically in FIG. 5. The number of line sets 186 in the epipolar image is equal to the number of lines in each of the starting images. Thus, using the starting images shown in FIG. 4, each of which contains 625 lines, each epipolar image will include 625 such line sets. Each line set includes pixel data from all of the original images 182 at the same location in the vertical or second image dimension. Stated another way, each line set includes pixels having ray direction vectors oriented at the same vertical angle or elevation relative to the plane of the camera locus. That is, the Nth line set includes the Nth line of pixels from each image. For example, line set $186_{27}$ in FIG. 5, includes the 27th line from image $182_1$ (line $184_{1,27}$); the 27th line from image $184_2$ (line $184_{2,27}$) and so on through the 27th line from image $184_{360}$. These lines are ordered in an order corresponding to the order of the viewpoints of the various images, i.e., line $184_{1,27}$, $184_{2,27}$ . . . , $184_{360,27}$. Each of the other line sets, from $186_1$ through $186_{625}$ has the lines arranged in the same order. Within each line set, as initially provided and as seen in FIG. 5, the lines of pixels extend in a first epipolar direction F and the lines are ordered in a second epipolar direction S. Unit 120 modifies each line set to the form shown in FIG. 6. Thus, unit 120 applies an initial offset of M pixels between each pair of adjacent lines in the image;

$$M=(R/B^*)\times P$$

where: R is the difference in the viewpoint angle A between the viewpoints of two successive images, i.e., the difference in angle A between camera $100_n$ and camera $100_{n+1}$; B is the horizontal field view of each camera, i.e., the difference between the maximum and minimum values of the horizontal offset angle B between ray 180 and the axis of the image and P is the number of pixels per line in the image. In effect, the offsetting process removes the effect of the differing camera angles and hence the differing image axis angles 106 from the epipolar image line sets. The relative positions of the pixels in the offset epipolar image are the same as if all of the cameras were pointed in the same direction from the different viewpoints. In the modified line set 188 (FIG. 6) the first dimension F corresponds to direction of the ray to the depicted feature relative to the line 108. That is, in the modified line set, the coordinate for the first dimension F to any pixel corresponds to the azimuth angle Z, i.e., the angle between the index line 108 and pixel ray vector or the ray 180 from the pixel in question to the real object imaged. For pixels taken from any particular image $182_n$ from camera $100_n$, the azimuth angle will be the sum of the viewpoint location $A_n$ from the reference line to the axis of the image and the offset angle B from the image 106 to the rear.

The second dimension S of each modified line set 188 corresponds to the viewpoint, i.e., the particular image from which the lines were derived. Thus, the second dimension S of each modified line set 188 represents the location at which the pixel ray vector intercepts circular locus 102. As seen in FIG. 6, the various features in real space, depicted found in the individual discrete images 182 form linear features in the epipolar line sets. The flag on flagpole 110 forms linear feature 110' whereas telephone pole 114 forms stripe 114'. Stripe 110' is substantially vertical. This indicates that the ray azimuth does not change appreciably with viewpoint, i.e., that the flag is far away. The stripe representing an object at infinite distance has a substantially constant ray azimuth and hence substantially zero change in a first direction F throughout its entire extent within the epipolar image line set. By contrast, stripe 114' representing a portion of utility pole 114 has a substantial slope or change in the first dimension or ray azimuth with viewpoint or second dimension S. The physical meaning of this change is that there is a large degree of parallax causing the apparent position of the telephone pole to shift as the viewpoint from which the image is taken shifts. The initial line sets 186 (FIG. 5) share the same properties. That is, stripe 110' as seen in the initial line set has a slope substantially less than that of stripe 114'. However, the slopes of both stripes are exaggerated substantially in FIG. 5 by the effect of camera rotation, which is removed in FIG. 6.

Although only two stripes are illustrated in FIGS. 5 and 6, every feature of the images captured by cameras 100 will be reproduced as a strip-like feature in the line sets of the epipolar images. Thus, each line set would include far more features than are illustrated. Also, only one line set is illustrated in each of FIGS. 5 and 6. The actual epipolar images again includes a line set for every horizontal scanning line in the original images. The epipolar image in this arrangement includes all of the information captured by the original cameras. Once again, the line sets are depicted in graphical form in FIGS. 5 and 6, and indeed can be displayed like any other two-dimensional image. However, it should be appreciated that manipulation of the data to form the line sets normally will be accomplished in digital form. Thus, the data for each pixel in each image may be stored at an address representing the location of the pixel within the original image 182 (FIG. 4). The data can be reformulated into the epipolar image line sets merely by reassigning addresses to the data constituting each line set from memory in a new order, so that the pixels from one line of a first image will read out followed by the pixels from the same line in the next image and so on. Stated another way, it is not essential that the physical storage units used to store the data have structures corresponding to the original lines of the image or to the epipolar image; the image structure may be specified entirely by data and address values stored in memory. However, memory structure such as those commonly referred to as VRAM or Video Random Access Memory, adapted to receive and pass data in the form of a two-dimensional raster can be utilized advantageously in handling and processing the epipolar image line sets.

The foregoing description refers to formation of a single epipolar image, including only one series of 625 line sets.

This process is repeated continually as new images are captured by cameras 100. Preferably, all of the cameras 100 operate in synchronism, so that each camera captures a new frame or a new field simultaneously with the other cameras. In this regard, unit 120 may form the epipolar images in real time, so that each epipolar image is formed at substantially the same time as the initial images captured. Alternatively, the epipolar image formation unit may operate on previously stored images captured by cameras 100. Thus, the original discrete images captured by the individual camera may be stored on conventional tape, disks or other media, preferably along with timing signals so that the various stored images can be synchronized, and the stored images can be played back and converted to epipolar images.

The epipolar images are then passed to compression unit 124. As aforementioned, compression unit 124 includes conventional video compression hardware and software. The line sets may be compressed using essentially the same algorithms and techniques as employed compression of standard video images. Each line set can be treated essentially as the equivalent of a field of video information. Each such line set may be compressed by techniques involving only manipulation of the data within the individual line set as, for example, run length encoding to compress lines of constant-value data into individual data words denoting the length of the constant value line. Alternatively or additionally, corresponding line sets in successive epipolar images may be compared with one another to detect changes, and a compressed signal incorporating only the change data may be provided. Examples of the former system include the Joint Photographic Experts Group or JPEG standard for still images, whereas an example of the latter includes the Motion Picture Experts Group or MPEG standard.

The compressed information from compression unit 124 is passed to the reproduction and transmission unit 126. Here again, the various line sets of each epipolar image are maintained separate from one another. Thus, the data relating to line set $186_{27}$ are handled separately from the data relating to line set $186_{28}$ and so on. Again, the data is in essentially the same form as standard, compressed two-dimensional fields, one such compressed field corresponding to each line set, and thus conventional techniques may be used. As mentioned above, the data transmission may include either instantaneous transmission or recordation of the data onto conventional media.

The data is received by playback and reception unit 130, either simultaneously with its processing by unit 126 or later in the case of recorded data. Unit 130, in conjunction with decompression unit 132, recovers or plays back the data to provide a series of epipolar images, effectively reversing the effects of compression and storage units 124 and 126. The internal structure and algorithms used by decompression unit 132 and playback and reception 130 will be determined by the precise structure of units 124 and 126. Here again, conventional algorithms, such as those used to process conventional two-dimensional raster images can be employed. Decompression unit 132 thus provides the series of epipolar images, each including 625 modified line sets 188 as discussed above with reference to FIG. 6. These epipolar images are provided as a series in time so that the timing between epipolar images corresponds to the timing between capture of the original image sets by cameras 100.

Virtual image synthesis unit 134 transforms the epipolar images into a series of visual images for the display devices associated with each observer, based upon the viewpoint information for that display device provided by observer viewpoint detection unit 156. As noted above, this information includes the radial distance from center point 160 of the observer frame of reference to the observer's eye associated with the display device; the observer viewpoint angle 166 between observer index line 164 and the radial line 162 from center 160 to the observer's eye; and the observer skew angle 168 between the central axis of the observer's eye and the radial line 162. This viewpoint data, taken in the observer frame of reference, defines a virtual viewpoint in the camera frame of reference. That is, for each viewpoint detected, the system forms a virtual image corresponding to the image which would have been captured by a camera at a virtual viewpoint in the camera frame of reference at a virtual viewpoint 190 (FIG. 7) having a radial distance 193 from center 104 equal to the radial distance from center 160 of the observer's eye; having a virtual viewpoint location angle 191 from index line 108 (FIG. 7) equal to the observer viewpoint location angle 166 from index line 164 (FIG. 3) and having a viewing axis 195 at a virtual viewpoint skew angle 192 to the radial line 193 corresponding to the observer viewpoint skew angle 168. The system synthesizes a virtual image 200 (FIG. 8) which would have been captured by a camera disposed at the virtual viewpoint 190. In each case, the system constructs each line of the virtual image from the corresponding line set in the epipolar image. Each virtual image, like each real image captured by each one of the cameras 100, has a first or horizontal dimension corresponding to the angle B between the axis of the image and the ray to the object represented by the pixel and again has a vertical dimension corresponding to the vertical angle (not shown) between the image axis and the ray. Here again, each virtual image 200 includes lines 202 of pixels 204, the lines 202 being ordered in the same manner as the lines 184 of the original images 182. Image synthesis image 134 forms each line 202 in virtual image 200 from the corresponding line set 188 in the epipolar image. That is, line $202_n$ is reconstituted from line set $188_n$, incorporating information from the Nth line of each original image 182.

Figure 7:
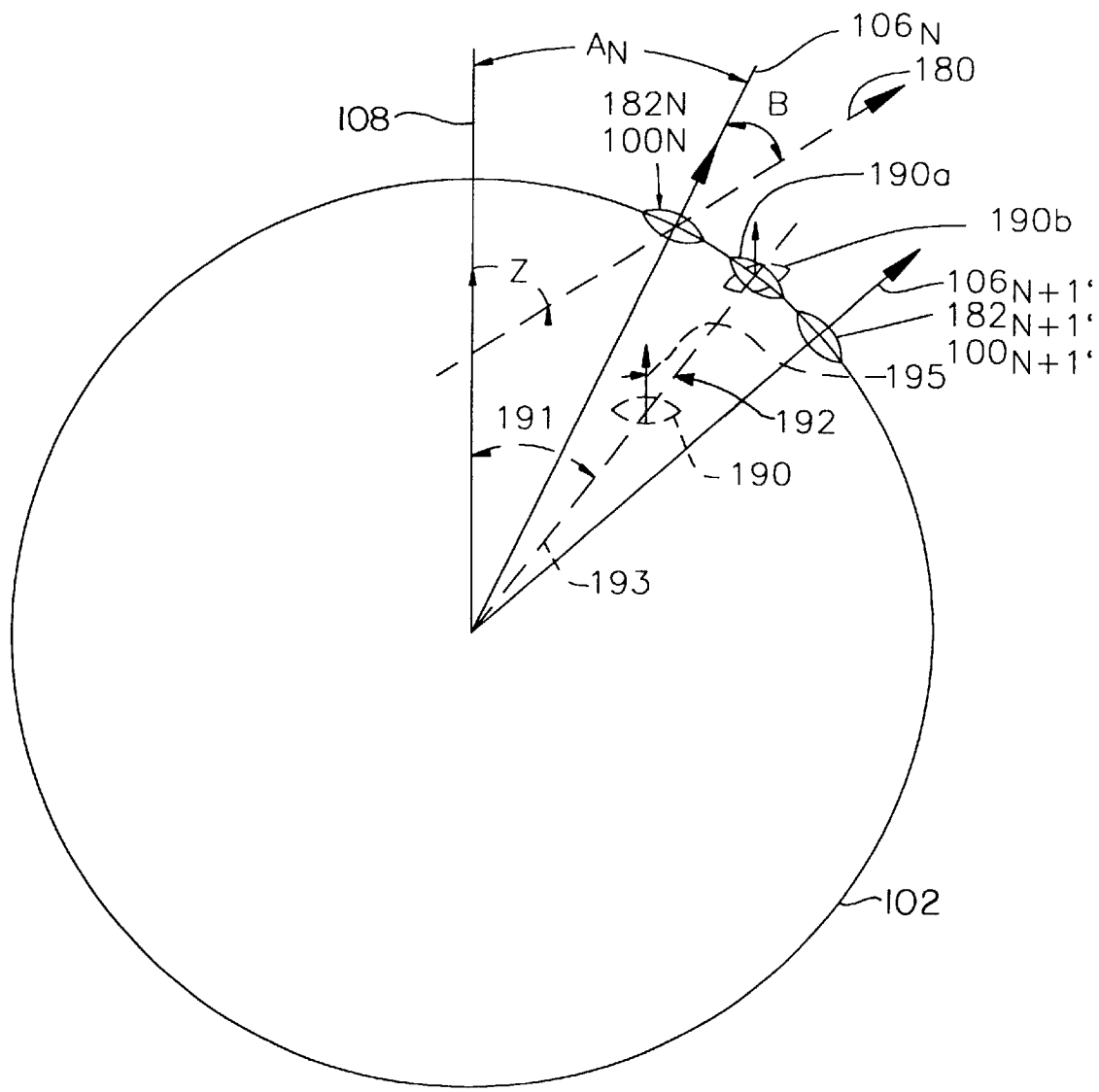
FIG. 7 is a diagrammatic plan view depicting various real and virtual viewpoints used in the system.

In a first step of the reconstruction process, the system selects a base image, and hence base lines of pixels 184s, for which the viewpoint location angle A corresponds to the viewpoint location angle 191 of the virtual viewpoint 190. That is, the system uses the second dimension information S to locate the desired line of pixels for use in the synthesis. Where the viewpoint location angle 191 is intermediate between the viewpoint location angles $A_n$ and $A_{n+1}$ of the discrete images 182, the system synthesizes an intermediate line of pixels by interpolation between the pixel values for corresponding pixels in adjacent lines. Thus, the viewpoint location angle 191 for the virtual viewpoint may lie between the viewpoint location angles A for images $182_n$ and $182_{n+1}$ (FIG. 7). In this case, the values constituting the pixel data in line 184s are derived by interpolation between the corresponding values in lines $184n$ and $184_{n+1}$. Such interpolation can be performed using standard techniques used in resolution enhancement of two-dimensional video raster images. One simple technique involves direct linear interpolation between the values of the pixel data in the adjacent lines such that $D_s = D_n + K(D_{n+1} - D_n)$ where:

$D_n$ is the data in a pixel in line $184_n$;

$D_{n+1}$ is the data in the pixel at the same position F in line $184_{n+1}$;

$D_s$ is the data of the pixel in line $184_s$ at the same position F

K is defined by:

$$K = (1a_{191} - A_n)/(A_{n+1} - A_n)$$

That is, pixels directly above and below one another as seen in the offset epipolar image are combined. For a few pixels at each end of line of line 184$_s$, the pixel value in one of lines 184$_n$ and 184$_{n+1}$, will be missing. In this case, the pixel value present in the other line can be used directly in line 184$_s$. The values in each pixel of base view line 184s will be closer to the values in line 184n if the location angle 191 of the virtual viewpoint is close to the location angle A$_n$ of camera 100n. This interpolation step in effect generates the pixel lines for a base image or virtual viewpoint image 190a at the correct location angle 191 but still disposed on the camera locus 102 (FIG. 7) and still having a directly radial view direction, i.e., a skew angle 192 of zero.

The original pixel lines 184 of image 188 represent zero skew angle. All of the images used to form the epipolar image were images taken with radially directed view axes. Each line 184s, derived by interpolation between pixel lines of the epipolar image, also represents a zero degree skew angle.

Image synthesis unit 134 further modifies interpolated line 184s to show the effect of a non-zero skew angle. To create a new line of pixels 210 representing the desired virtual image or non-zero skew angle image, the system shifts the pixel data in interpolated line 184s by a preselected number J pixel positions where;

K=(F/SA$_{192}$)×P

B is the field view of the original camera which captured the pixel line, i.e., the difference between the maximum and minimum values of image angle B;

SA$_{192}$ is the skew angle 192; and

P is the number of pixels in the line.

Figure 10:
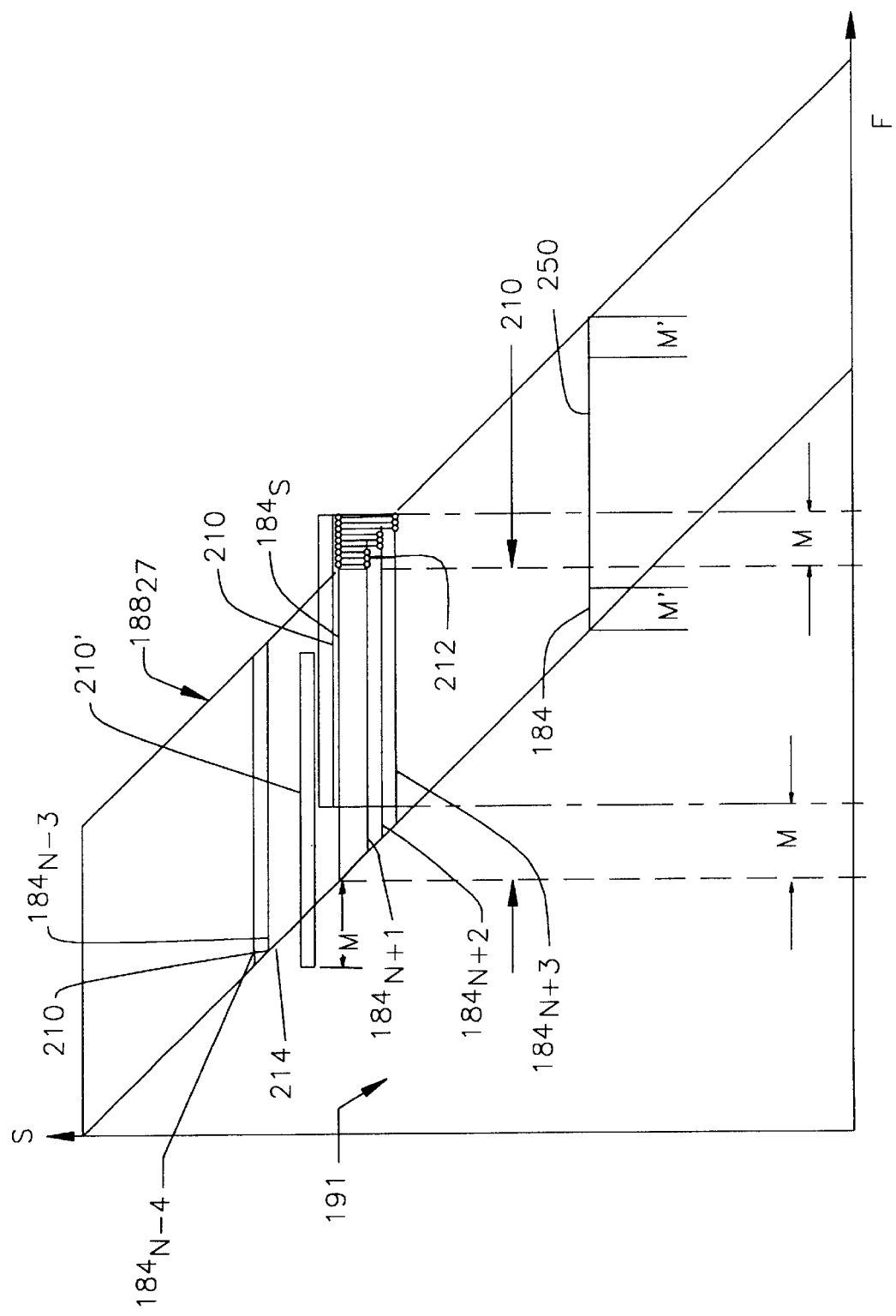
FIG. 10 is a further diagrammatic view of the line set depicted in FIG. 9, depicting a further operation.

Thus, where the skew angle is such that the new line 210 is shifted to the right, the system begins to create the new line 210 by copying the Jth pixel in line 184 (J pixels from the left-hand end of the line as seen in FIG. 10) into the first pixel position of line 210, the J+Ith pixel of line 184s into the second pixel position of line 210 and so on. This process continues until the system reaches the (P-J)th pixel of line 184s, which is the last pixel in that line. To provide the last J pixels in line 210, the system copies the pixel data from the closest pixels in adjacent lines of the offset epipolar image 188$_{27}$. Thus, the system selects supplementary pixels 212 so that the ray azimuth or first dimension F increase progressively from the end of base view line 184$_s$. Each supplementary pixel 212 is selected from the line 184 in the epipolar image closest to base view line 184$_s$ in the second dimension, i.e., from the line representing a pixel ray vector intercepton the locus close to that of the base view line, and from pixels at the required ray azimuth. Thus, as illustrated in FIG. 10, the first few supplementary pixels 212 are copied from line 184$_{n+1}$, next adjacent to the base view line 184s. The next pixels are copied from line 184$_{n+2}$ and so on. Thus, after reaching the last pixel in the base view line 184s, the system selects new supplementary pixels by incrementing the ray azimuth or first dimension F, finding the closest line 184 having a pixel at the incremented ray azimuth and copying the pixel data from that pixel into a pixel of virtual viewpoint line 210, and continuing in this fashion until line 210 has been filled in with P pixels.

Alternatively, where the skew angle 192 has the opposite sign, line 210 is shifted in the opposite direction relative to the base view line 184. That is, line 184 is shifted to the left as seen in FIG. 10, to the position indicated at 210' in the drawing. In this instance, the system derives the first J pixels of line 210', adjacent the left-hand end of the base view line 182s from the closest lines 184 in the image. Thus, the system starts at a ray azimuth or first-dimension value F equal to the ray azimuth of the first pixel in base view line 184s minus the skew angle 192. The system selects the line with the viewpoint location angle S closest to the virtual viewpoint location angle of 191 base view line 184s having a pixel at that ray azimuth as, for example, the line at 184$_{n-4}$ having pixel 214 at the required ray azimuth. The system copies pixels from this line into virtual viewpoint line 210' until it reaches a ray azimuth at which line 184$_{n-3}$ has its first pixel 216, whereupon the system begins copying pixel data from line 184$_{n-3}$, and so on until the system reaches the beginning of base view line 184$_s$. Thus, the system maps pixels from lines 184$_{n-4}$ through line 184n and 184s on to virtual view image line 210'. That line may be displayed as the appropriate line of the virtual view image 200 (FIG. 8). Thus, where the line set used to derive the line was image 188$_{27}$, constructed from the 27th line of each discrete image, the resulting line 210' will be displayed as the 27th line 202$_{27}$ of the virtual view image 200. The net effect of the mapping process is to select pixels in discrete images which have pixel ray vectors 180 (FIG. 7) with intercepts and direction close to the intercept and direction of a pixel ray vector from the pixels of the virtual view image. The other lines of the virtual view image are constructed similarly from the other line sets. For any given virtual view point, the mapping of pixels is the same for every line set in the epipolar image and every line of the virtual view image. Moreover, because this pixel mapping is a one-to-one mapping wherein the pixel data in one pixel of the epipolar image line set is mapped into one pixel of the virtual view image line, the mapping can be accomplished simply by rearrangement of address pointers denoting the pixel data in the memory of a computer. There is no need to manipulate the pixel data values themselves in this stage.

Figure 11:
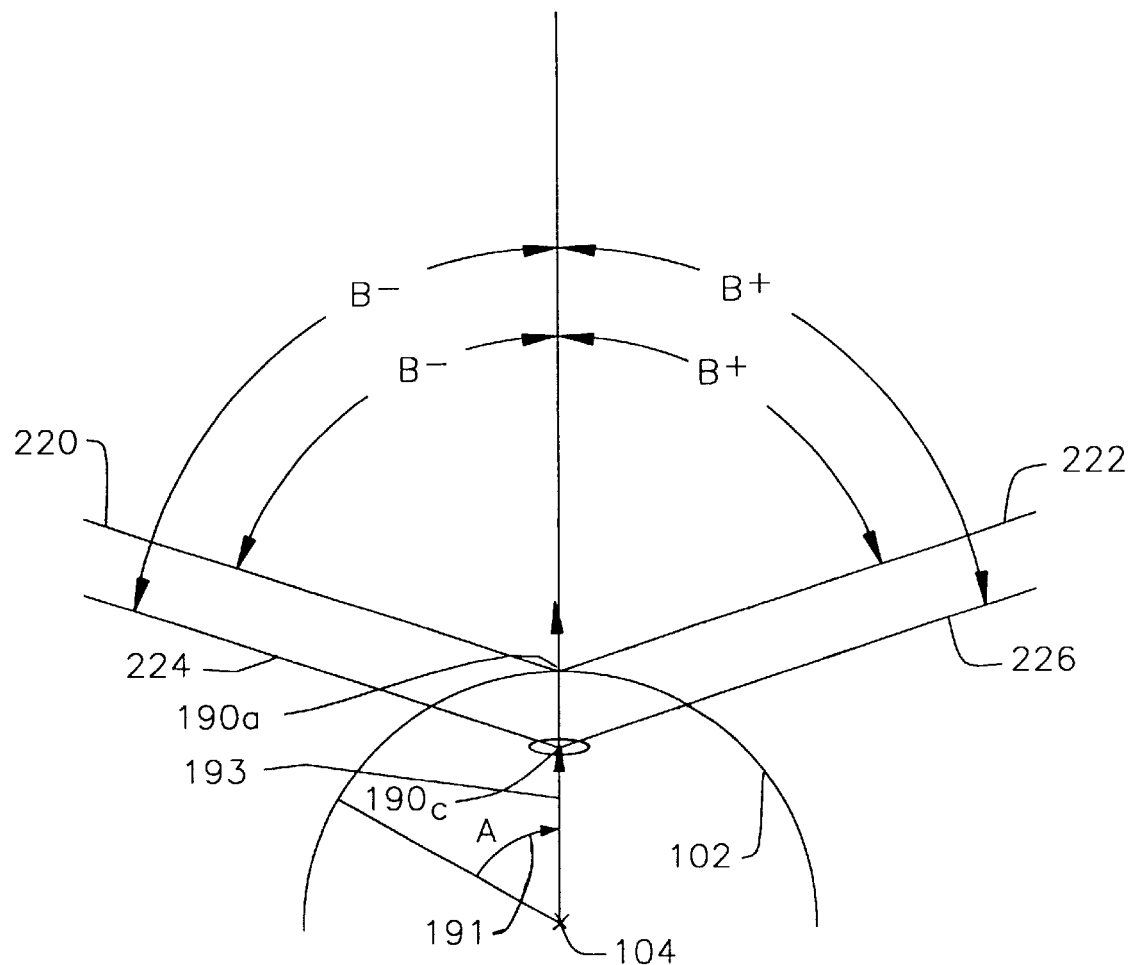
FIG. 11 is a view similar to FIG. 7 but depicting a further virtual viewpoint.

As best illustrated in FIG. 11, the virtual viewpoint 190$_c$ may be disposed inside the locus 102 of the discrete viewpoints, i.e., closer to the center of curvature 104 than the locus. In physical terms, this means that the observer 146 is disposed inside the observer viewpoint locus 158. In FIG. 11, the virtual viewpoint has a skew angle of zero. That is, the virtual viewpoint 190$_c$ is disposed radially inwardly of locus 102 on a particular radial line, and the view direction is outwardly, along the radial line. Stated another way, virtual viewpoint 192 represents the viewpoint which a virtual camera would have if it were disposed initially at viewpoint 190a and then moved radially inwardly while maintaining the same orientation. To maintain the same apparent field of view, the system must incorporate information from beyond the base image representing viewpoint 190a on locus 102. Thus, the base image has a preselected field of view 2B, maximum negative ray offset B− to maximum positive ray offset B+. The end pixels of the interpolated line 184s (FIG. 6) representing this line in the image at location 190a contain information only to edge rays 220 and 222. To provide a line representing the virtual view image at 190$_c$, with the same apparent angular field of view from B− to B+, the image must incorporate pixel data from ray 224 to ray 226. Accordingly, the system derives each line of the virtual viewpoint image for viewpoint 190$_c$ by processing the corresponding line set 188 to derive the interpolated base pixel line 184s having the appropriate viewpoint location angle 191 for viewpoint 190a, as above. The system then forms a virtual view image line 230 from the base pixel line 184s and from other lines in the line set 188. One step in this formation process is to map the pixel data in the entire interpolated line 184s into a central region 228 of line 230. Line 180s and line 330 as a whole each include P pixel. The central region 228 includes C pixels where C/P is the proportion of the final field of view (from edge ray 224 to edge ray 226) encompassed by the original view (from line 220 to line 222).

Mapping of the P pixels in line 184s into the C pixels of central portion 228 may be performed by many standard algorithms. One simple algorithm is to map pixels 121 from line 184s onto line 228, but to skip one pixel in line 184s after each [P/(P−C)] pixels have been mapped. A higher-quality algorithm is to calculate the pixel data for each pixel within central portion 228 by calculating a spot in the first dimension of line 184 corresponding to the center point of the pixel in central region 228. Thus, each pixel of region 228 is treated as including [P/C] pixel positions on line 184s. The Nth pixel of central portion 228 thus is positioned at N(P/C) pixel positions on line 184s. Where this pixel position is not an integer, the value for pixel data is calculated by merging the pixel data from pixel centered on either side of the calculated position in line 184s, depending upon the proportionate distance between the calculated position and the center of each pixel in base line $184_s$. For example, a pixel in central region 228 having calculated position 137.7 on line $184_s$ has a distance of 0.7 from pixel 137 and a distance of 0.3 from pixel 138 on line $184_s$ will have pixel data equal to the sum of 0.7 times the pixel data of pixel 138 and 0.3 times the pixel data of pixel 137.

In addition to forming the pixels in central region 228, the system maps pixel data from adjacent lines of the line set 118 into end regions 232. In this instance, the system selects (P−C)/2 supplementary pixels for each end region 232. The pixels are selected at a constant ray azimuth in each end region. That is, all of the pixels mapped into end regions 232 have ray azimuth equal to the ray azimuth for the last pixel in the baseline 184s. Thus, the supplemental pixels mapped into end zone 232a of line 230 have ray azimuth equal to the ray azimuth of the right-hand end pixel of line 184s. This corresponds to the azimuth of right-hand edge ray 222. Conversely, the pixels mapped into end zone 232b of line 230 have ray azimuth equal to that of the left end pixel in baseline 184s, i.e., ray azimuth equal to the azimuth of left edge ray 220. In effect, the image from the base viewpoint 190a is expanded by filling in its edges with additional pixel data derived by looking parallel to the edges. This pixel data of course comes from the adjacent lines 184 through 184. Typically, one pixel is mapped from each adjacent line.

Figure 13:
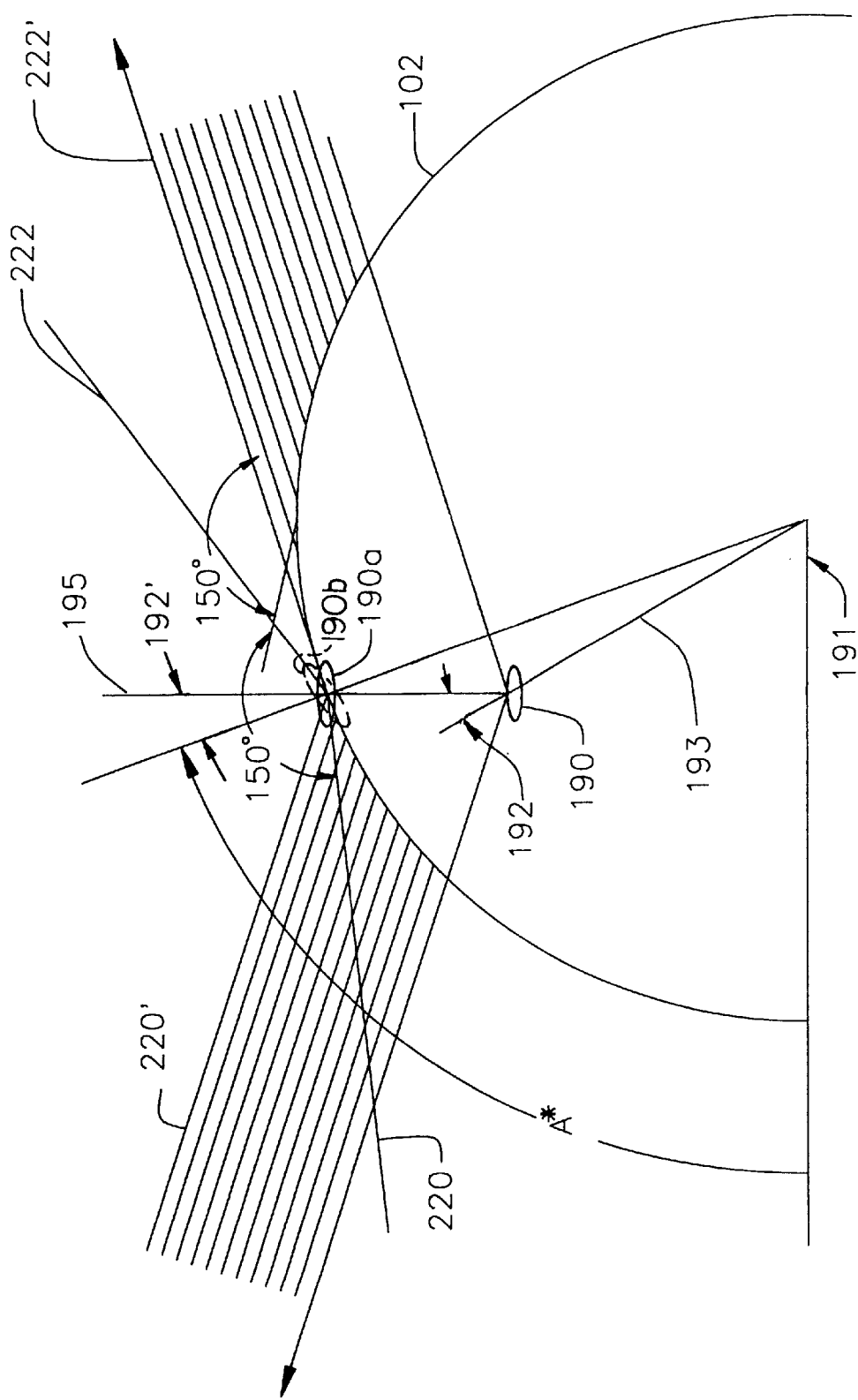
FIG. 13 is a view similar to FIG. 11 but depicting a different virtual viewpoint.

As seen in FIG. 13, a virtual view image can be formed for a completely arbitrary virtual viewpoint 190 inside discrete viewpoint locus 102 having any orientation and placement, i.e., any viewpoint location angle 191 and any skew angle 192, whether zero or non-zero. For a non-zero skew angle, the system first calculates the intercept of the virtual viewpoint centerline 195 on the discrete viewpoint locus 102. That intercept lies at a viewpoint location angle A* which is readily calculable from the geometry of the system. The radially directed (zero skew angle) viewpoint 190a at viewpoint location angle A* is used as a base view for synthesis of the virtual view at viewpoint 190. Where angle A* is exactly equal to the location angle of one of the original, discrete views 182, that view will serve as the base view. In the general case however, angle A* falls between the view point angles of two discrete views. In this situation, the base view is an interpolated view. Thus, within each line set 188 of the epipolar image, the system forms an interpolated base viewpoint line 184s in the same manner as described above with reference to FIG. 6 and FIG. 9. Within each line set 188, the system then forms a skewed viewpoint pixel line 210, representing a line from a virtual viewpoint 190b disposed on locus 102 at the same viewpoint location angle A* but having a skew angle 192' so that the center line of the view is directed along the same center line 195 as the desired virtual view.

Skewed viewpoint line 210 is formed in exactly the same way as the skewed viewpoint line 210 as discussed above with reference to FIG. 10, i.e., by starting at the Jth pixel of base viewpoint line $184_s$ and mapping the pixels one for one into line 210 (FIG. 14) until reaching the end of line 184s, then mapping pixels one for one from the closest available lines 184 until a line of P pixels is produced. Here again, the mapping operation need not involve physical movement of the pixel data for the various pixels, but instead may incorporate mere modification of the addresses for data in a list of data included in the line. In effect, by the image skewing process, the system moves from an image having a field of view bounded by edge rays 220 and 222 to a new image having a field of view bounded by edge lines 220' and 222' (FIG. 13).

Figure 12:
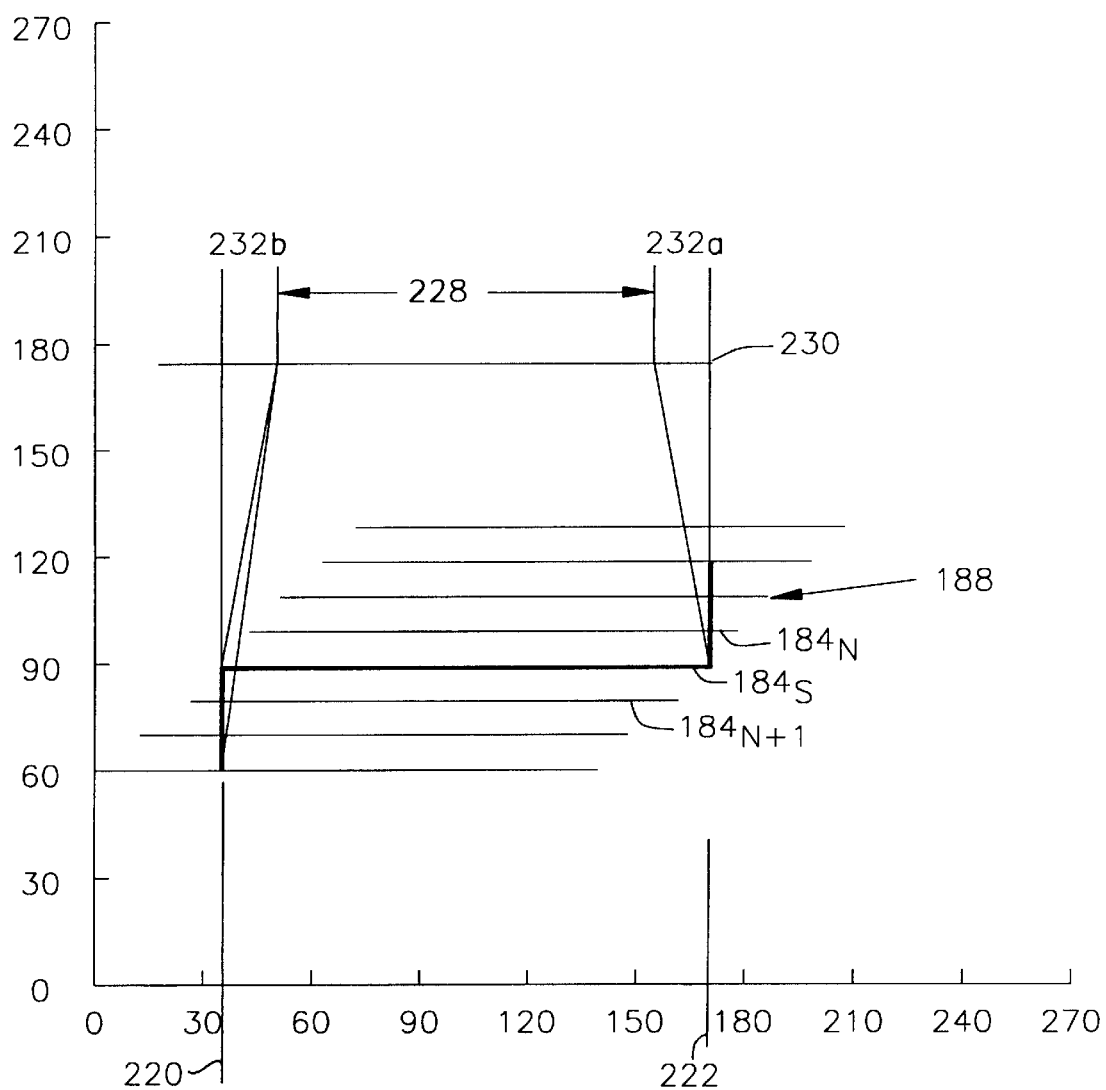
FIG. 12 is a further view similar to FIG. 10 but depicting the operations required for the virtual viewpoint of FIG. 11.
Figure 14:
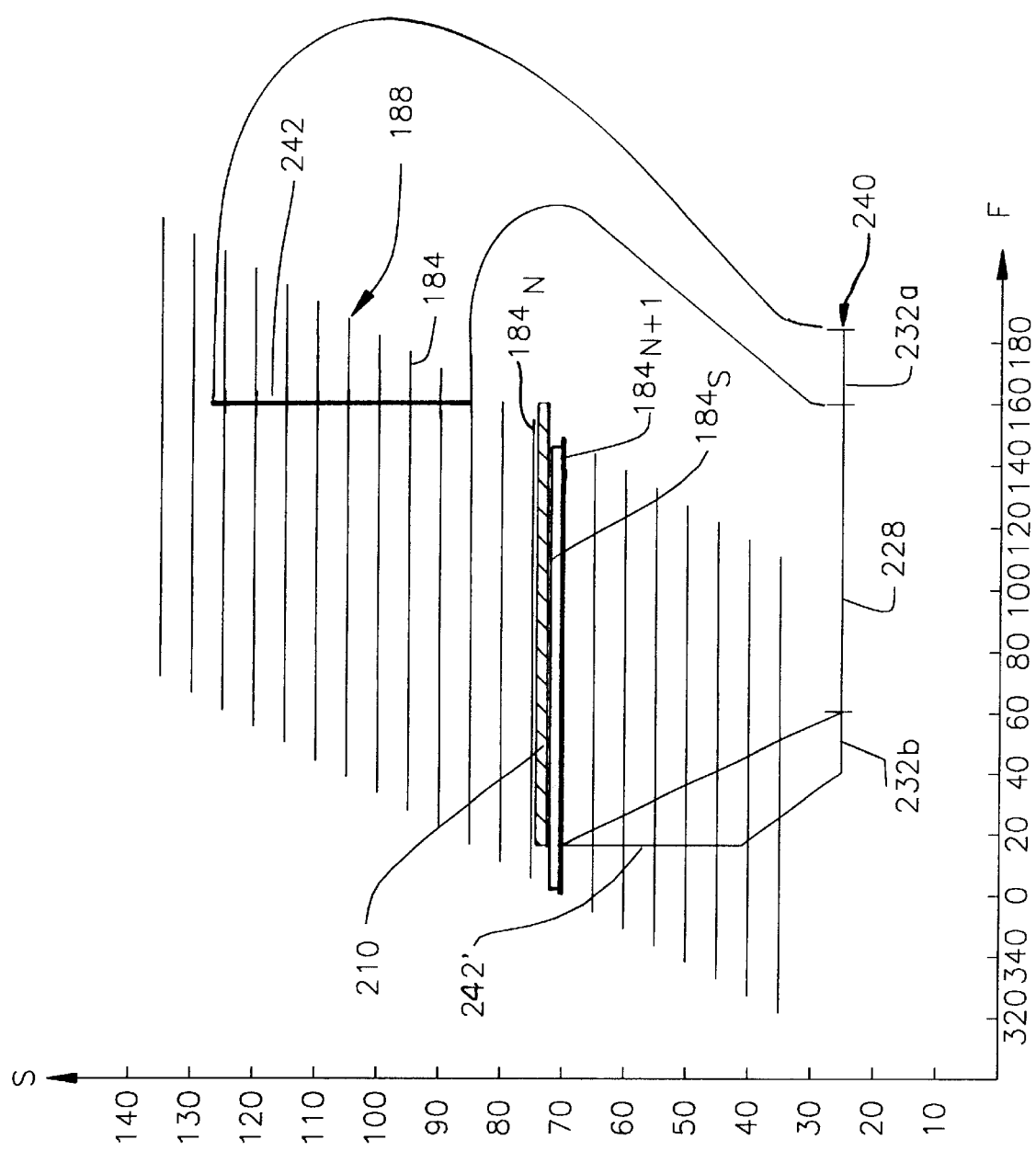
FIG. 14 is a view similar to FIG. 12 but depicting the operations required for the virtual viewpoint of FIG. 13.

In the next stage of the operation, the system maps the pixel data constituting the P pixels in skewed image line 210 into C pixels constituting a central region 228 (FIG. 14) on a composite line 240. This mapping procedure is performed in the same way as described above with reference to FIGS. 11 and 12. The system fills in the end zones 232a and 232b of composite line 240 by mapping pixels from other lines having the same ray azimuth angles as the end pixels of skewed image line 210. That is, the system selects pixels from other lines having the same ray azimuth as edge lines 220' and 222' of the skewed image. In the same manner as discussed above, the system starts at the right-hand end of line 210, as seen in FIG. 14, and selects supplementary pixels having the same azimuth angle, i.e., on a vertical line 242 extending upwardly from the end pixel of line 210. The same process at the opposite end of line 210 proceeds along a vertical line 242', i.e., at the same azimuth angle as the left end of skewed image line 210 and hence at the same azimuth angle as edge line 220'.

In this arrangement as well, the same mapping procedure is used for each line set in the epipolar image 188. Thus, depending upon the position and orientation of each observer, the virtual viewpoint image 200 displayed to that observer may include pixel line 202 formed by any of the procedures discussed above. However, in each case, every pixel line 202 in the virtual viewpoint image will be formed by the same procedure. Different images are required for each of the different observer viewpoints as, for example, for the two displays 138 and 140 associated with observer 146, and for the two display 142 and 142 associated with the other observer 150. Image synthesis unit 134 forms all of these different images substantially simultaneously. The nature of the image-formation process lends itself to this simultaneous operation. All of the images are formed by operations performed on the same line sets. Ordinarily, the data in the original, discrete images used to form the virtual viewpoint images include progressively changing, full motion video data. An epipolar image formed from each such new set of frames or fields and new epipolar images are continually supplied to the virtual image synthesis unit 134. Thus, changes in the discrete images with time are reflected in the virtual viewpoint images formed by unit 134 so that the observer sees the scene in full motion video. Moreover, detection unit 156 and a synthesis 134 operate in real time with respect to the movements of the observer. Thus, as each observer moves, the virtual viewpoint images presented to his or her eyes change in essentially the same manner as they would if the observer were actually present and moving about within the real scene.

In a method according to a further embodiment of the invention, the system constructs each line of the virtual image for a virtual viewpoint 590 disposed at arbitrary radial distance 593 from the center of a circular locus in a viewpoint plane and at arbitrary virtual viewpoint location angle 591 from the index line 508 (FIG. 2) using a plurality of different base images on locus 502. For each line in the virtual image, the system treats the pixels of the line in many small sets, each such pixel set encompassing less than all of the pixels in the line. Pixels 510, 511 and 512 constitute one such set. As in the embodiments discussed above, the horizontal or first dimension location of each pixel corresponds to the angle B between the central axis 595 of the virtual image and a vector 561, referred to herein as a "pixel ray vector" or "ray direction vector" extending from the pixel through the virtual viewpoint 590 to the object imaged by the particular pixel. Here again, there is an arbitrary skew angle or horizontal first dimension angle between the central axis 555 of the virtual image and the viewpoint location vector 593 from the center 504 of the locus. Accordingly, the difference between angle B and the skew angle represents a ray offset angle 596 between pixel ray vector 561 and virtual viewpoint location vector 593. Stated another way, for a given virtual viewpoint location 590 and skew angle 595, the horizontal or first dimension location of a pixel specifies the ray azimuth Z' or angle between the pixel ray vector 561 and the index line 508.

The mutually adjacent pixels 510, 511 and 512 define pixel ray vectors 561a, 561b and 561c at ray azimuth angles close to one another. The system selects a principal pixel ray vector 563 extending from virtual viewpoint 590 and having azimuth close to the ray azimuths of the pixel ray vectors 561a, 561b and 561c of the pixels constituting the set. In this instance, principal pixel ray vector 563 is coincident with the pixel ray vector 561b from the center pixel 511 of the set.

Figure 22:
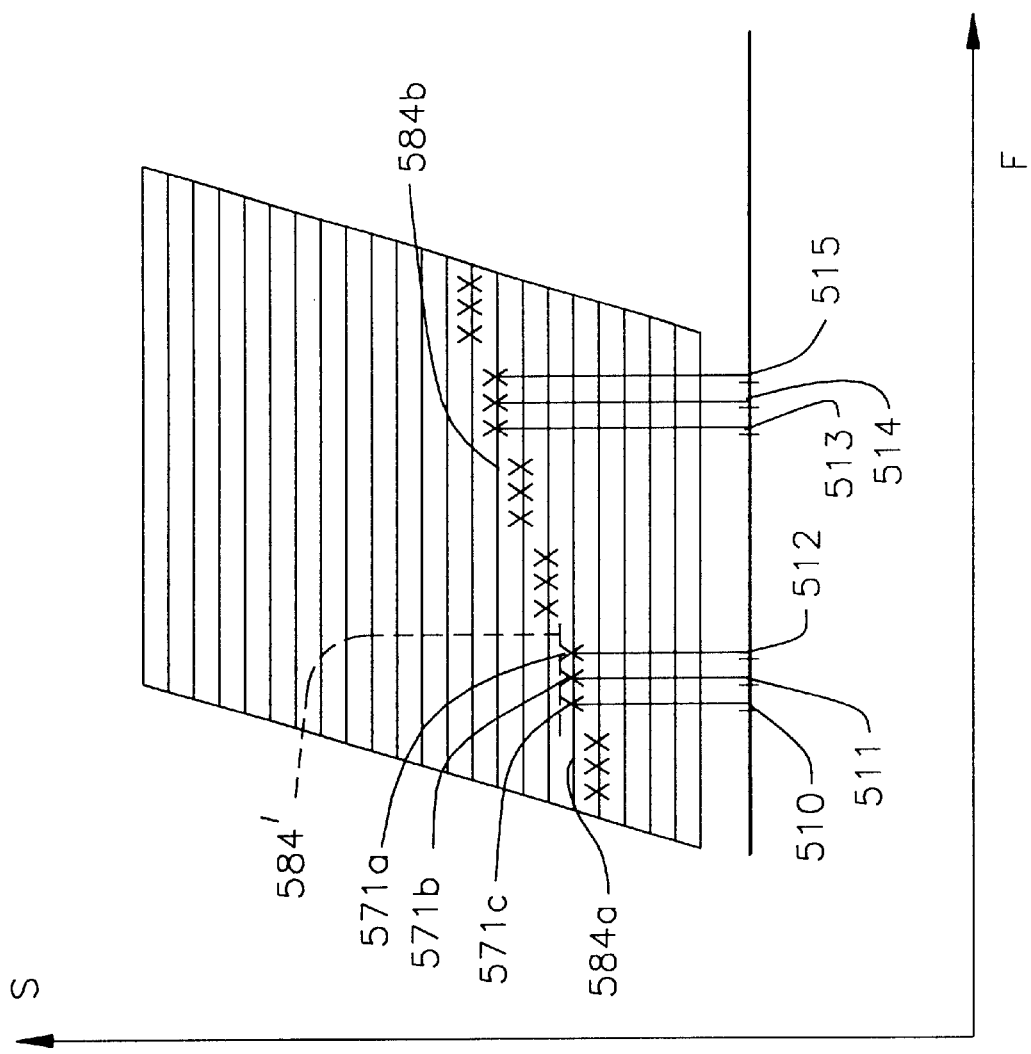
FIG. 22 is a view similar to FIG. 14 but depicting operations in accordance with another embodiment of the invention.

The system then computes the intercept of principal pixel ray vector 563 on the discrete viewpoint locus 502 and selects a viewpoint on that locus having a view location 589a at or close to the intercept, i.e., the discrete image having viewpoint location closest to the intercept of vector 563 and the locus of 502,. The system thus selects the corresponding line 584a in the line set of the epipolar image (FIG. 22). If the intercept of the principal pixel ray vector on the locus falls between two adjacent discrete image locations, then the system picks the discrete image location closest to the intercept.

In the next step of the method the system selects a pixel within the selected line having ray azimuth closest to the ray azimuth of each virtual pixel. Stated another way, the system selects the pixel in the selected line having first epipolar coordinate F closest to the ray azimuth of the individual pixel. For example, pixel 571a has a pixel ray vector at an azimuth close to the ray azimuth of virtual pixel 512 and hence pixel 571a of the discrete image is selected for pixel 512. Pixel 571b has a ray azimuth close to that of pixel 511 and so on. The data from each pixel in line 584a is mapped to the virtual view image line by copying such data to the corresponding pixel in the virtual view image line.

This process is repeated using additional pixel sets. A different discrete or interpolated image on locus 502 is selected for each pixel set. For example, the set of pixels 513, 514, 515 of the virtual view line has a principal pixel ray vector 563' extending through the view location of discrete image 589b. Line 584b corresponding to image 589b is used as the source of pixel data copied to pixels 513, 514, 515. Other pixel sets take pixel data from other image and hence from other lines of the epipolar image line set.

This approach may be implemented with larger pixel sets or, preferably, with smaller pixel sets. In a particularly preferred variant, each pixel set used in the process consists of only a single pixel, defining only a single pixel ray vector. In this case, the principal pixel ray vector is the pixel ray vector of the single pixel. With a single-pixel set, the line of the epipolar image used to provide the pixel data may be a discrete-image line, corresponding directly to the intercept of the pixel ray vector of the pixel on the view locus 502. The pixel data is provided substantially without parallax error.

The net effect of this system is to select a particular pixel from among the various pixel data in the various discrete images for each pixel of the virtual viewpoint image and copy the pixel data for that pixel as the pixel data for the pixel of the virtual viewpoint image. The selected pixel has a pixel ray vector with azimuth close to the azimuth of the ray azimuth of the pixel in the virtual viewpoint image, i.e., an azimuth close to the azimuth of the pixel ray vector from the virtual viewpoint image. The pixel selection takes place within a single line set of the epipolar image, i.e., from a set of discrete image pixels from the line of each discrete image corresponding to the line of the virtual viewpoint image. Thus, all of the pixels in the line set have pixel ray vectors with the same elevation angle as the pixel in the virtual viewpoint image. Thus, the particular pixel selected from one of the discrete images has a pixel ray vector with direction in azimuth and elevation close to the direction of the pixel ray vector from the pixel of the virtual viewpoint image.

The selected pixel is taken from a particular discrete image having a viewpoint close to the intercept of the pixel ray vector from the pixel of the virtual viewpoint image. The pixel ray vectors associated with pixels of a discrete image intercept the viewpoint locus at the viewpoint of the discrete image. Therefore, the pixel ray vector from the selected pixel has an intercept close to the intercept of the pixel ray vector from the pixel of the virtual viewpoint image.

The virtual view image line can be of essentially any length, corresponding to essentially any range of ray offset angles B and any field of view in the virtual image. The use of small pixel groups, such as the three-pixel groups illustrated in FIG. 22 and 22 approximates the condition when each pixel group includes only a single pixel. Here again, the pixel data copied into each pixel of the virtual viewpoint image is taken from a pixel with pixel ray vector direction and intercept close to the pixel ray vector direction and intercept of the pixel in the virtual viewpoint image. In a further variant of this approach, the pixel data is not directly copied pixel-for-pixel from each selected line 584 (FIG. 22) into the virtual view image line. Rather, where the virtual view pixel has a ray azimuth or first-direction epipolar coordinate F falling between the ray azimuths of the adjacent pixels in a selected discrete line 584, data from the two closest pixels can be combined and mapped onto one pixel. For example, in FIG. 22, virtual view image line pixel line 511 has a ray azimuth between those of pixels 571c and 571b on line 584a. The data from pixels 571b and 571c can be combined, as by a weighted average lending more weight to the pixel data in pixel 571b, closer to the desired ray azimuth and the combined data may be mapped into pixel 511. This arrangement provides even more exact pixel data for the pixels of the virtual view image line. Here again, synthetic pixel data for each pixel of the virtual viewpoint image is derived from selected starting pixels with pixel ray vectors having direction and intercept on the locus close to the direction and intercept of the pixel ray vector of the virtual viewpoint image pixel. In a further alternative, the system can respond to an intercept of a pixel ray vector from the falling between discrete image locations by preparing an interpolated line 584' in each line set corresponding to a view location on the discrete image locus at the intercept. The system uses this interpolated pixel data in the same way as the starting or discrete-image pixel data, to derive the synthetic pixel data. In this arrangement, the starting pixel data which contributes to each synthetic pixel includes pixel data from two discrete images with viewpoints, and hence pixel ray vector intercepts, close to the pixel ray vector intercept of the synthetic pixel on locus 502. By selecting one or more interpolated pixels with pixel ray vector directions close to the pixel ray vector direction of the synthetic pixel, the system implicitly selects the starting or discrete-image pixels with close pixel ray vector directions. Thus, in this arrangement as well, the pixel data of the synthetic pixel is derived from starting pixels with pixel ray vector directions and intercepts close to the pixel ray vector direction and intercept of the synthetic pixel . In yet another alternative, the system may prepare the interpolated images and add the interpolated images to the line sets of the epipolar image, so that the pixel data in the interpolated images are incorporated into the starting data. As in the arrangements discussed above, lookup tables may be employed. That is, the system may store tables of data denoting the epipolar coordinates of a discrete or interpolated image to select for each combination of virtual view location and pixel location within the virtual view line.

Figure 24:
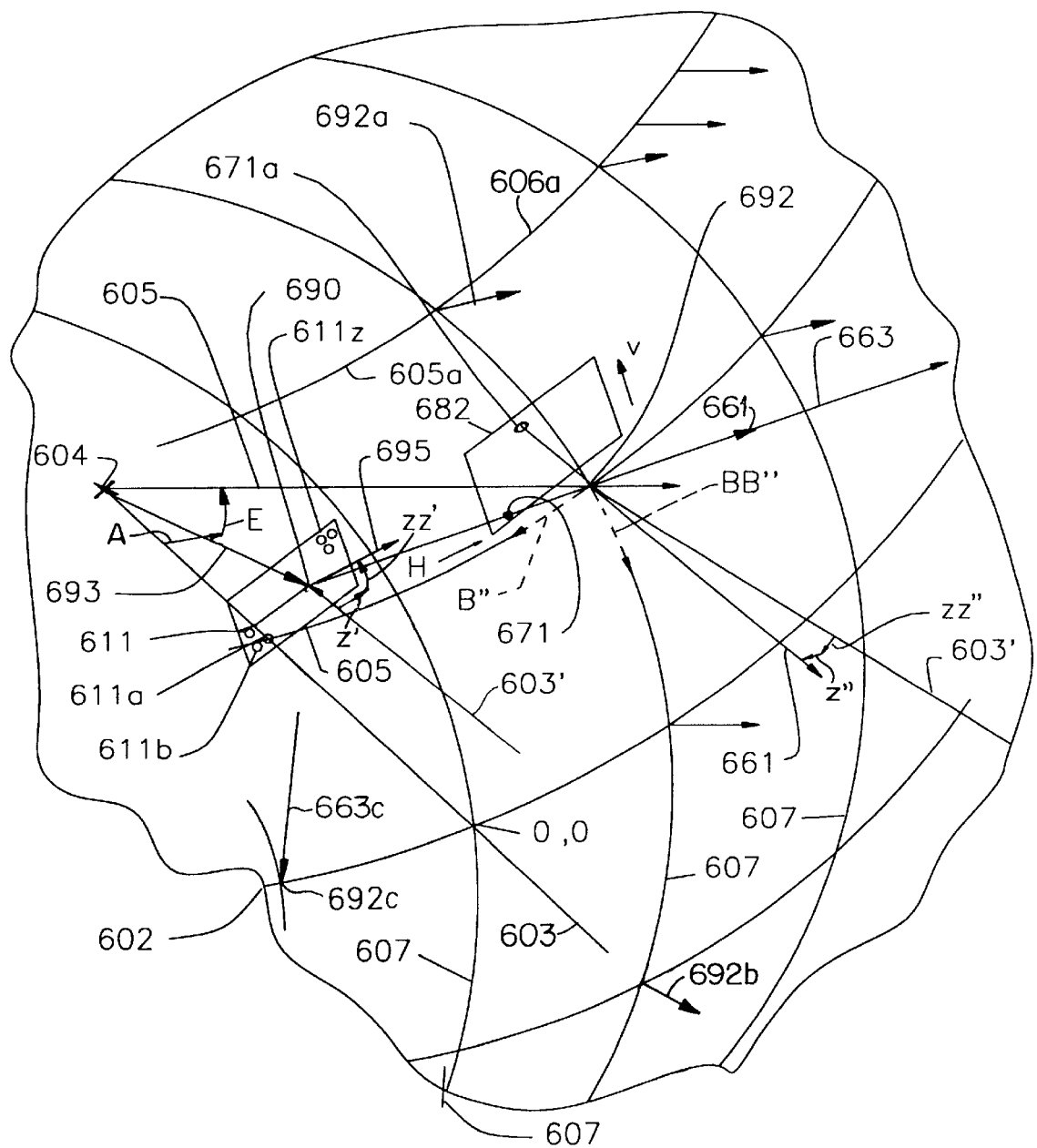
FIG. 24 is a diagrammatic perspective view of a viewpoint locus in accordance with yet another embodiment of the invention.

As illustrated in FIG. 24, a generally similar approach may be applied using a set of discrete images distributed in two orthogonal directions on a multi-dimensional image locus such as the surface 602 of a sphere or sector of a sphere having a center 604. In this embodiment, the location of a discrete image on surface 602 is specified by the azimuth angle A and elevation angle E of the viewpoint location vector 605 extending from center 604 to the viewpoint 692. Thus, surface 602 has azimuth and elevation dimensions. Values of azimuth and elevation are specified with reference to an index line 603 passing through the surface at a location of zero azimuth and zero elevation. Each viewpoint has a principal view direction vector coincident with the view location vector 605. That is, each view is directed substantially radially with respect to the spherical view locus.

The azimuth and elevation of the discrete images correspond to azimuth and elevation in the frame of reference of the scene. For example, where the discrete images are views captured by real cameras looking at a real scene, the camera which captures discrete image 692a would be disposed at a relatively high elevation and pointing upwardly in the scene, whereas the camera which captures discrete image 692b would be mounted at a lower elevation and pointing downwardly in the real scene.

Here again, each discrete image has first and second image dimensions, desirably vertical and horizontal dimensions V and H parallel to the elevation and azimuth directions respectively. The pixels 671 constituting each discrete image are offset from one another in these vertical and horizontal directions. Here again, the first or horizontal image dimension H of any pixel in a particular image represents the difference in azimuth B" between (1) the pixel ray vector 661 from the pixel 671 through discrete image location or viewpoint 692 and (2) the principal view direction vector of the image, which in this embodiment is coincident with the view location vector 605 from the center of the sphere to the viewpoint 692 of the image. Correspondingly, the location of the pixel 671 in the vertical image dimension V represents the difference BB" in elevation between the pixel ray vector 661 and the principal view direction vector 605. Thus, the vertical and horizontal image dimensions of each pixel 671 in the discrete image define the azimuth Z" and elevation ZZ" of the pixel ray vector 661 through viewpoint 692 relative to an index line 603' parallel to the index line.

A two-dimensional virtual viewpoint image for a virtual viewpoint 694 specified by a virtual viewpoint location vector 693 having radius different than the radius of the spherical surface 602 and at arbitrary azimuth and elevation angles relative to index line 603 can be derived as a two-dimensional array of virtual image pixels 611. A set of mutually adjacent pixels 611a, 611b . . . 611n is selected from within the array. Here again, each pixel defines a pixel ray vector 695 from the virtual pixel through the virtual viewpoint 690. Each such pixel ray vector defines an azimuth angle Z' relative to the index line 603 or relative to an index line 603' parallel to index line 603. Similarly, each pixel ray vector defines an elevation angle ZZ' relative to the index line. The various pixels 611 within each small set of mutually adjacent pixels define a principal pixel ray vector 663 which has similar azimuth and elevation angles. Here again, in the limiting case, each small group of adjacent pixels includes only one pixel 611 and the principal pixel ray vector 663 is simply the pixel ray vector 695 of that pixel.

For each set of virtual pixels, the intercept of the principal pixel ray vector 663 on the view locus 602 is determined, and the discrete image at viewpoint 692 closest to that intercept is selected. By selecting this discrete image, the system has selected a group of starting pixels having pixel ray vectors 661 with intercepts on locus 602 close to the intercept of principal ray vector 663, and thus close to the intercepts of pixel ray vectors 695 associated with each virtual viewpoint image pixel 611 in the group of adjacent pixels Within the selected discrete image or group of starting pixels, the system selects the pixel or pixels 671 having pixel ray vectors 661 with azimuth and elevation angles closest to the azimuth and elevation angles of the pixel ray vector 695 of the particular pixel. Data from that pixel is then copied directly into the pixel 611 of the virtual image. Different pixel sets defining different principal pixel ray vectors 663 will take data from different discrete images 682. For example, the pixel set including virtual pixel 611z will define a principal pixel ray vector passing through discrete viewpoint 692c. Here again, for each synthetic pixel of the virtual viewpoint image, the system selects a starting pixel in one of the discrete images having a pixel ray vector with direction and intercept close to the direction and intercept of the pixel ray vector of the synthetic pixel, and derives the pixel data for the synthetic pixel from the pixel data of the selected starting pixel.

Figure 25:
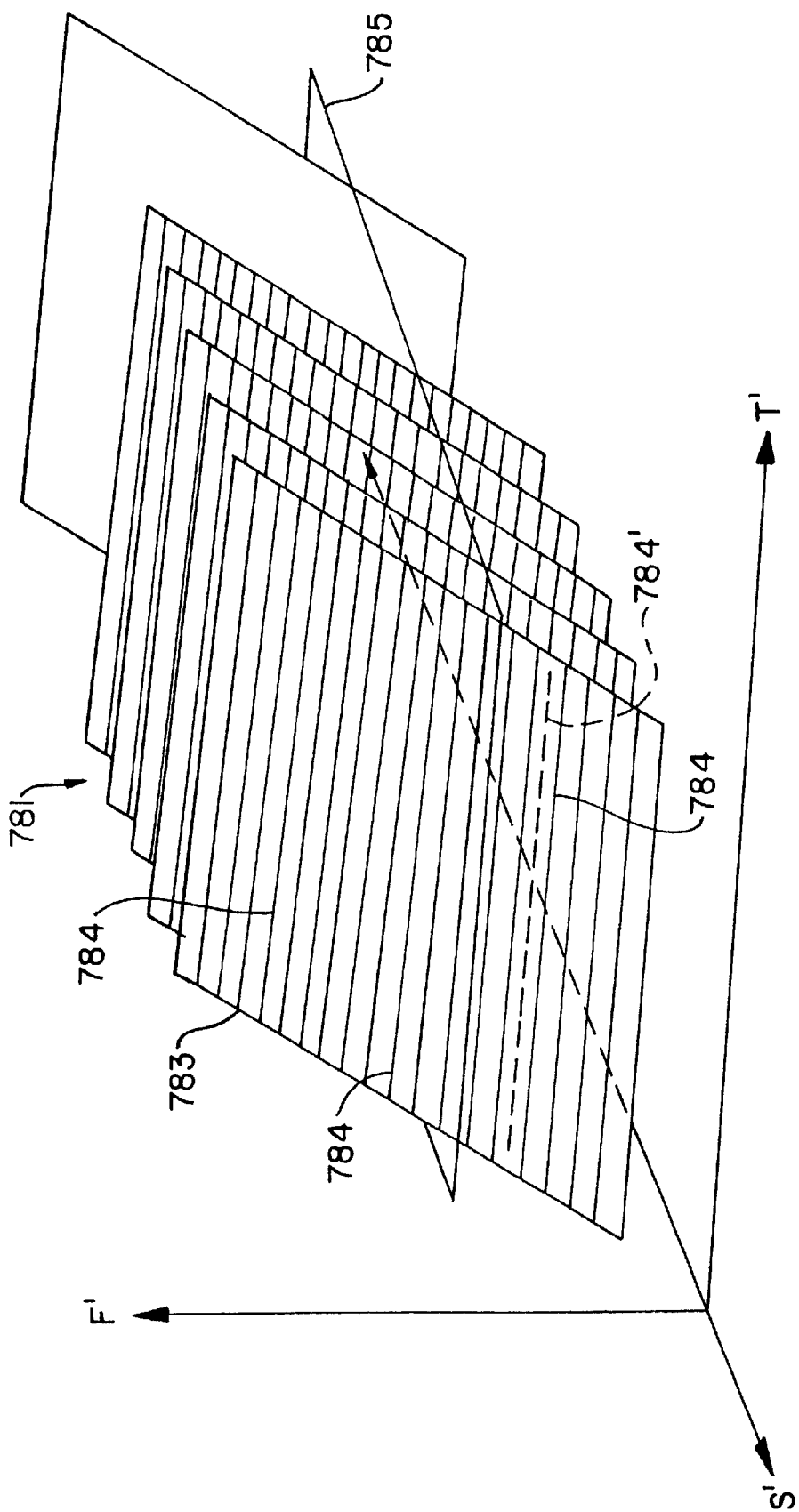
FIG. 25 is a diagrammatic view of a line set associated with the viewpoint locus of FIG. 25.
Figure 26:
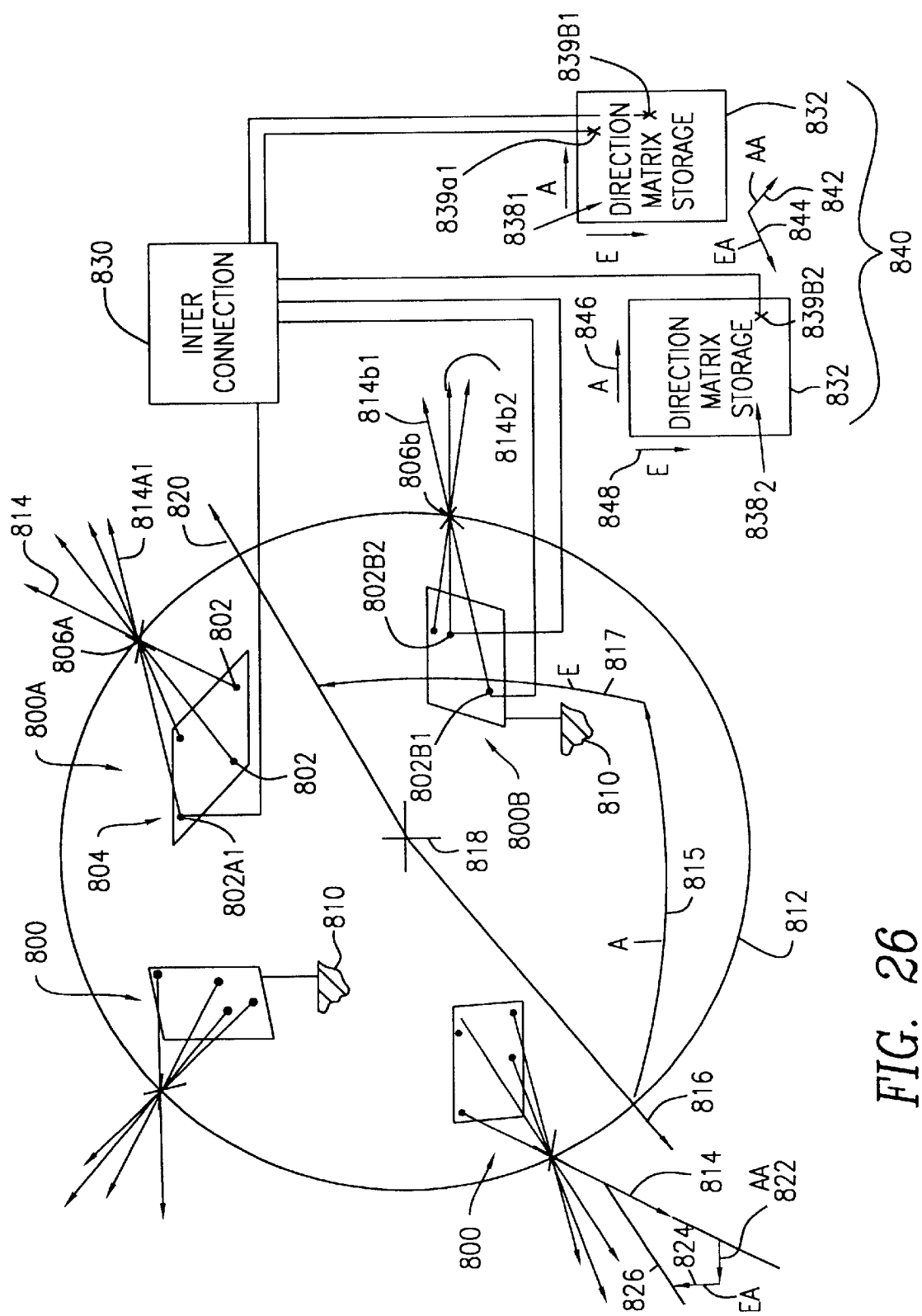
FIG. 26 is a diagrammatic view depicting certain elements of a method in accordance with a further embodiment of the invention.

The foregoing method permits construction of a virtual view image, but does not provide for interpolation between discrete images. That is, where a principal pixel ray vector has an intercept between discrete view locations 692, the system must accept the closest discrete view location. In an alternative method, using the same discrete view locations and geometry as depicted in FIG. 25, the data from the discrete images is converted into a three-dimensional epipolar or transform image including a plurality of line sets as illustrated in FIG. 25. Each such line set includes one line of pixel data 784 from each discrete image. Each such line in the entire line set has the same second or vertical image dimension coordinate V (FIG. 24). Each line set has a first epipolar coordinate F' corresponding to azimuth of the viewpoint of the discrete image and a second epipolar coordinate S' corresponding to elevation of the viewpoint of the discrete image. Here again, because the pixel ray vectors from all of the pixels in each discrete image intercept the locus at the viewpoint of the discrete image, the first and second epipolar coordinates F' and S' specify the intercepts of the pixel ray vectors for the pixels. Because all of the pixels in the line set have the same second image dimension or difference in elevation between the pixel ray vector and the view location vector of the image itself, the second epipolar coordinate S' of each pixel also represents the elevation angle Z" of the pixel ray vector from the pixel. That is, for every pixel in a given line set, the elevation of the pixel ray vector is equal to the elevation of the image location vector 605 plus a constant, this constant being different for different line sets but uniform throughout any given line set. Each line set also has a third epipolar coordinate corresponding to the azimuth Z" of the pixel ray vector 661 of the particular pixels. Thus, each line set as depicted in FIG. 26 includes lines from numerous discrete images, and hence includes starting pixel data elements from numerous discrete images. The lines from images on any circular locus 605 of constant elevation fall in a single plane 783 of the epipolar image having constant second epipolar coordinate whereas lines from images on the same line of longitude 607 or circular locus of constant azimuth fall in a plane 785 of constant first dimension F'. As in the epipolar images discussed above, the number of line sets in the epipolar image equals the number of horizontal lines within each discrete image. The line sets are formed by processes similar to those used in formation of the two-dimensional line sets discussed above.

Figure 23:
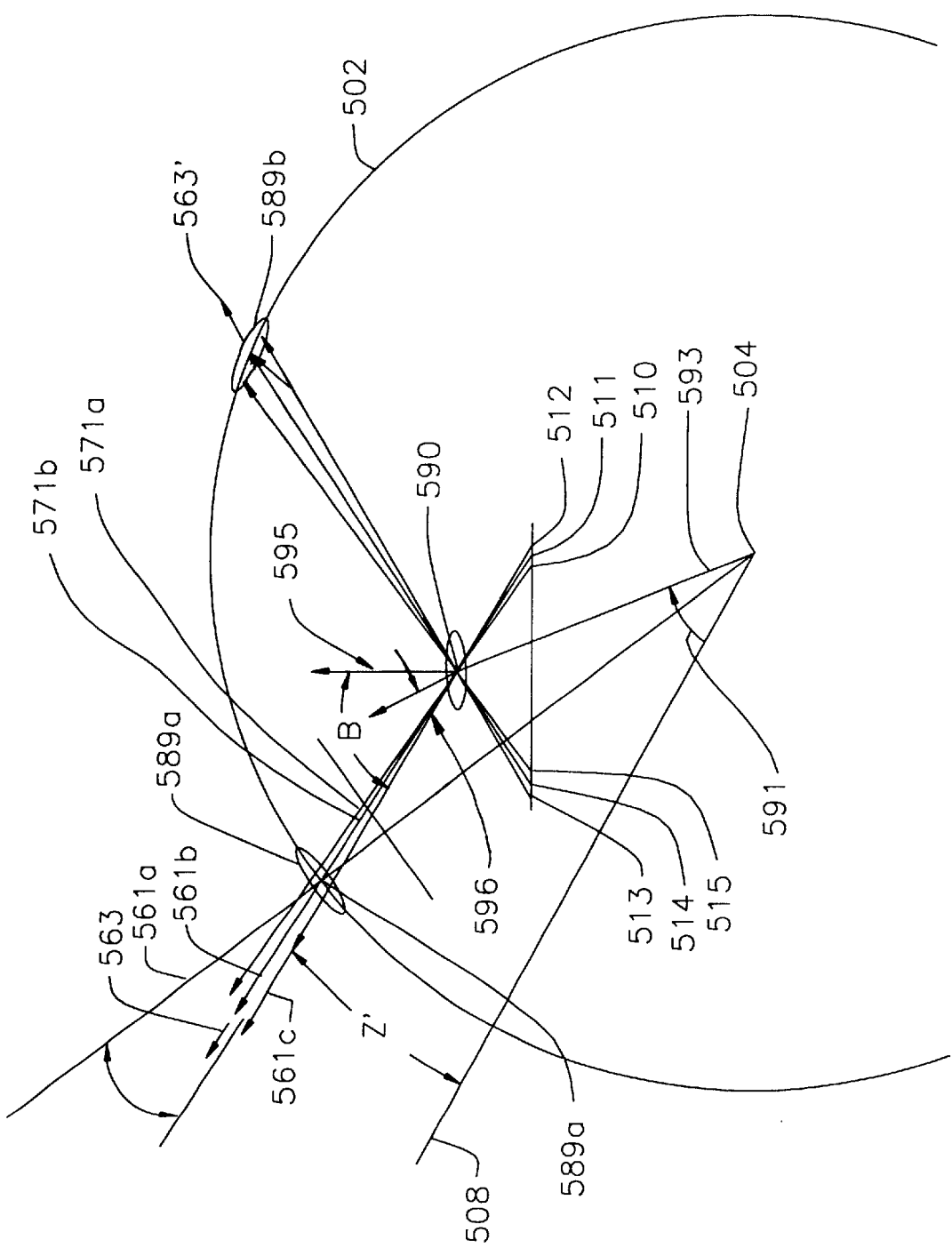
FIG. 23 is a view similar to FIG. 13 but depicting a virtual viewpoint associated with the embodiment of FIG. 22.

The epipolar image is used to create a virtual view image by a process similar to that discussed above with reference to FIGS. 22 and 23. Thus, for each set of pixels 611 the system selects an image location on locus 602 close to the intercept of principal pixel ray vector 663 on the locus. That is, the system provides a line of pixels 784 having first and second epipolar coordinates close to the intercept for use as a base line. Where the intercept does not coincide exactly with a discrete image location, the system can form an interpolated line 784' by interpolation between the pixel data in the for surrounding discrete image lines 784 at the same ray azimuth or third epipolar coordinate T. Here again, the pixel data from the selected line 784 or 784' of the epipolar image may be mapped into the pixels of the virtual view image line being synthesized by simple copying from one pixel of the selected line to the pixel having the closet azimuth in the virtual view image. Alternatively, a more complex mapping scheme involving interpolation between adjacent pixels can be employed. Here again, the pixel data for each synthetic pixel in the virtual viewpoint image is derived from starting pixels having pixel ray vectors with directions and intercepts on the locus close to the direction and intercept of the pixel ray vector from the synthetic pixel, through the virtual viewpoint.

Line sets involving three-dimensional epipolar images can be compressed, stored and combined by methods corresponding to handling of the two-dimensional epipolar line sets discussed above. For example, each plane 783 or 785 of such an epipolar line set can be handled or combined by the same methods as applied to the individual two-dimensional epipolar line sets described above.

Apparatus according to a further embodiment of the invention, shown in FIG. 26, also includes a plurality of cameras 800. Each camera includes numerous pixel sensing elements 802 arranged on an image plane 804. Each camera also has a viewpoint 806. Each pixel sensing element 802 of a camera is arranged to receive illumination along a physical sensing direction extending from that pixel sensing element through the viewpoint 806 of the camera. For example, the pixel sensing elements may be phototransistors or photodiodes, and may be provided as elements of a solid state imaging device such as a charge coupled device ("CCD") array, or any other conventional solid state imaging device. Alternatively, the pixel sensing elements may be portions of a conventional image orthicon or other vacuum-electronics television imaging tube. The camera typically includes conventional optical elements such as a lens (not shown) at the viewpoint 806 of the camera for directing light onto the various pixel sensing elements. Only a few pixel sensing elements of each camera are depicted in FIG. 26 for clarity of illustration. Typically, each camera would include a large number of pixel sensing elements covering essentially the entire image plane 804.

The cameras are physically supported by a structure 810, schematically indicated in FIG. 26, so that the viewpoints 806 fall on a spherical locus 812. Thus, the physical sensing directions of the various pixel elements in each camera pass through an intercept coincident with the viewpoint 806 on locus 812, coincident with the viewpoint 806 of that camera. Each pixel sensing element 802 is associated with a pixel ray vector 814 passing through the intercept 806 and extending in the physical sensing direction of the pixel sensing element. Here again, the locus 812 has two orthogonal directions of azimuth or longitude 815 and elevation or latitude 817 which specify the position of a point on the locus. Each of these dimensions is defined as the angle between a reference vector 816 from the center 818 of the locus and a position vector 820 between the center and the point of the locus for which the position is to be specified. Also, the directions of the various pixel ray vectors are defined as azimuth angles 822 and elevation angle 824 in mutually orthogonal directions. These azimuth and elevation angles are measured between a line 826 parallel to index line 816 and the pixel ray vector in question. The azimuth angle and elevation angle specifying the direction are measured in directions parallel to the azimuth or longitude and elevation or latitude designating position on locus 812.

Figure 27:
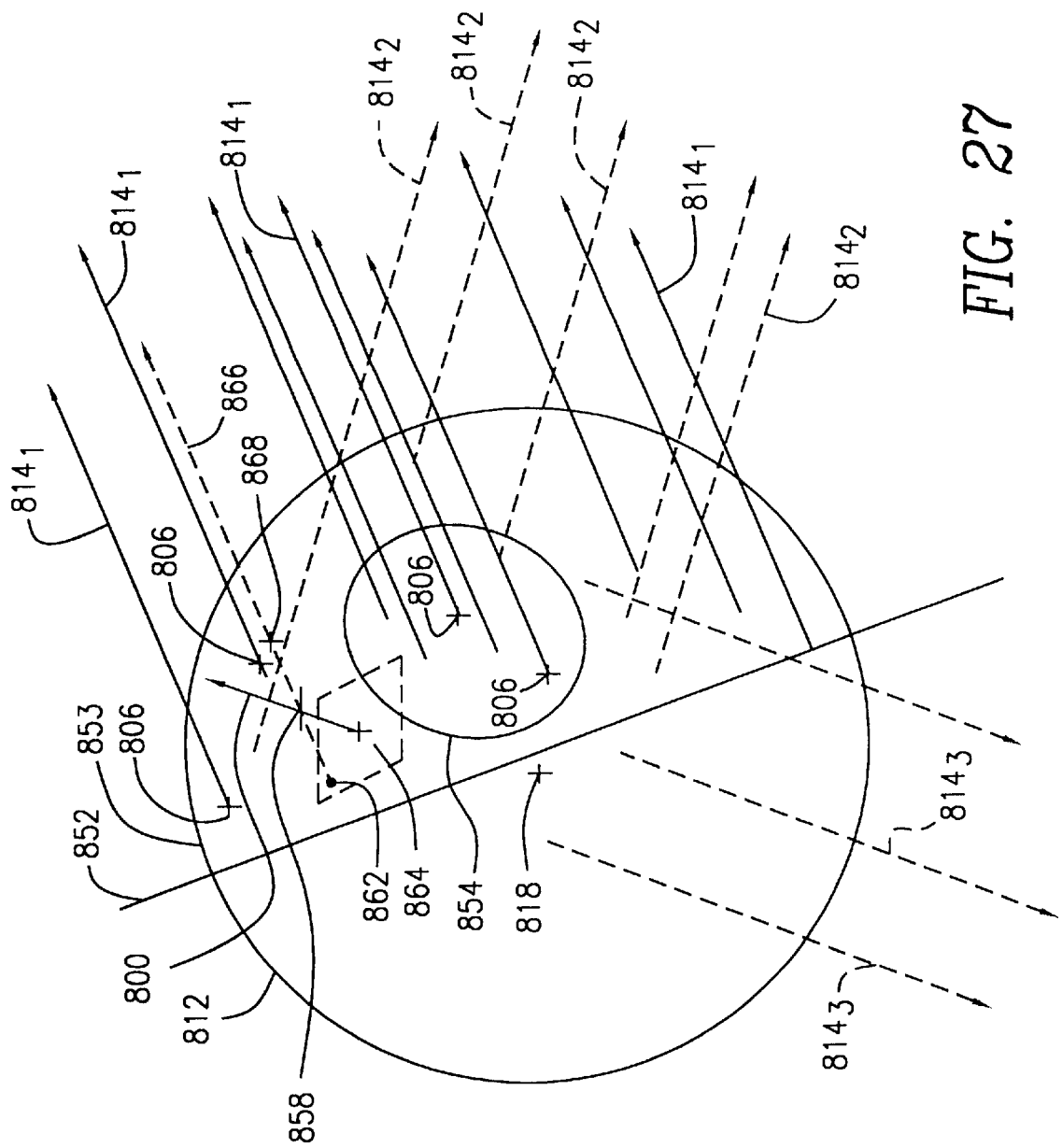
FIG. 27 is a further diagrammatic view depicting certain elements of the method shown in FIG. 26.

The pixel sensing elements 802 of all of the various cameras are connected to an interconnection device 830, arranged to actuate various pixel sensing elements 802 and direct the data captured by the various pixel sensing elements into memories or storage elements 832. The interconnect device is arranged to store the pixel data captured by the various pixel sensing elements in storage elements 832 a four-dimensional array or transform image. This transform image includes a plurality of direction matrices. Each direction matrix contains the pixel data from pixels having pixel ray vectors 814 in a single direction. For example, pixel ray vector 814A1 from one camera 800A and pixel ray vector 814B1 from camera 800B have the same direction, i.e., the elevation angle and azimuth angle of these vectors are identical to one another, or within a preselected tolerance of one another. Therefore, the pixel data elements 839A1 and 839B1 from pixel sensing element 802A1 and 802B1, associated with these pixel ray vectors are routed into a single direction storage matrix 8381. Pixel ray vector 814B2 has a different direction and accordingly the pixel data element 839 from pixel sensing element 802B2 associated with vector 814B2 is copied into a different direction matrix 8382. i.e. Stated another way, the pixel ray vectors associated with the pixels of a single direction matrix are parallel to one another to within a small tolerance, but have different intercept locations on locus 812. This is also shown in FIG. 27, wherein additional pixel ray vectors 8141 parallel to vectors 814A1 and 814B1 are shown in solid lines. All of these vectors 8141 have different intercepts 806 on locus 812. These intercepts are distributed over a hemispheric portion 853 of the locus, lying to the right of plane 852. The pixel data elements from pixel sensing elements 802 associated with all of the different ray vectors 8141 are stored as a single direction matrix. Conversely, pixel data elements associated with pixel ray vectors 8142, shown in long-short broken lines in FIG. 27 are stored as part of the second, separate direction matrix 8382, whereas the pixel data elements from pixels associated with pixel ray vectors 8143 are stored as part of yet another direction matrix. All of the pixel data elements stored in each single direction matrix have associated pixel ray vectors which are parallel to one another, and parallel to a common ray direction. Such parallelism may be either exact or more typically, within a preselected small tolerance. Thus, there is a separate direction matrix associated with each of numerous directions. Only a few of these are depicted in the drawings for clarity of illustration.

The various direction matrices are arranged within the overall transform image 840 along a first and second dimension 842 and 844 corresponding to the azimuth angle and elevation angle of the common direction associated with each direction matrix. Within each direction matrix, the individual pixel data elements 839 are arranged in dimensions 846 and 848 corresponding, respectively, to the latitude or azimuth and longitude or elevation on the locus of the intercepts 806 of the pixel ray vectors associated with the individual pixel data elements. For example, within direction matrix 8381, pixel data element 839A1, associated with pixel ray vector 814A1 at intercept 806A is located at a different position than pixel data element 839B1, associated with pixel ray vector 814B1 having an intercept 806B on locus 812.

The dimensions of the overall transform image 840, and of each direction matrix 838 are illustrated in physical form in FIG. 26 for convenience. It should be appreciated that the pixel data storage elements are actually held in positions of an electronic memory or in positions on a storage medium such as magnetic tape, disc or the like. There need not be any particular correspondence between physical position and position in the dimensions of the matrices and transform image. However, the data desirably are stored in a defined order of addresses with the memory or storage medium, so that the position or address of each direction matrix implicitly denotes the location of that matrix in dimensions 842 and 844 of the direction matrix and thus implicitly denotes the common ray direction of that particular direction matrix. Similarly, the position or order of each data element 839 within a direction matrix implicitly denotes the location of the intercept of the associated pixel ray vector on the locus.

The common ray directions of the direction matrices may be non-uniformly distributed. For example, a relatively large number of direction matrices may have common ray directions within a first range, whereas the system may include a relatively small number of direction matrices having common directions within a second range. In this case, the system provides relatively high angular resolution within the first range of directions and relatively low resolution within the second range. Such a system can be used, for example, where the scenes to be viewed incorporate non-uniform levels of detail. For example, where the scene to be viewed is a scene in a stage performance occurring in an auditorium, the system can be arranged to provide higher angular resolution in the directions towards the stage than in the direction toward the ceiling of the auditorium. Similarly, the intercepts of the pixel ray vectors in a direction matrix need not be uniformly distributed within the region of the locus associated with that direction matrix. For example, as shown in FIG. 27, the pixel ray vectors 8141 associated with direction matrix 8381 are non-uniformly distributed over hemisphere 853 so that a relatively large number of such vectors have intercepts falling within a region 854, i.e., so that the density of intercepts per unit area is higher in region 854 than in other regions of the hemisphere 853.

The relationship between address or location in the transform image 840 and direction of a particular direction matrix, and the relationship between address or location within the direction matrix and intercept location is not necessarily uniform. Stated another way, a given difference in address or location within the image between two different direction matrices may denote a relatively large or relatively small difference between the common ray directions. Also, a given difference in location within a direction matrix between two different pixel data elements may denote a relatively large difference in intercept location or a relatively small difference. Lookup tables desirably are provided to store correlations between directions and/or intercept locations and addresses.

Interconnect network 830 actuates the pixel sensing elements 802 to capture a scene by copying data from the pixel sensing elements into locations in storage 832. The data from one pixel sensing element is copied directly into one location in storage. Depending upon the form of output from the pixel sensing elements, signal processing of the individual data from individual sensing elements, such as amplification and/or digitization may be required. However, no complex mathematical processing of data from multiple pixel sensing elements is required. Thus, the interconnect element 830 merely pixel sensing copies the data into storage elements 832. This permits capture of scenes at a high data rate. Indeed, the rate of capture is limited only by the bandwidth of the communication channels provided interconnect element 830 and the input bandwidth of memories 832. In the limiting, highest rate case, the interconnect element can actuate all of the pixel sensing elements 802 simultaneously and copy all of the pixel data elements into the storage elements simultaneously, so as to capture an entire scene including objects in all directions outside of the locus, almost instantaneously. In practice, the interconnect element actuates the pixel sensing elements in a preselected order. Preferably, the pixel sensing elements are actuated in an order corresponding to the order of the directions of the associated pixel ray vectors. Most preferably, the pixel sensing elements are actuated in sets, each set corresponding to one or more direction matrices. pixel sensing Thus, the pixel sensing elements associated with one direction matrix are actuated and the data is copied into the storage elements, then the pixel sensing elements associated with the next direction matrix are actuated and the data elements are copied and so on. pixel sensing Stated another way, a first set of pixel sensing elements, incorporating sensing elements in various cameras, is actuated to acquire pixel data elements representing illumination in a first physical sensing direction, and then another set of pixel sensing elements is actuated to acquire pixel data elements representing illumination along a neighboring physical sensing direction and so on, so that the physical sensing direction is scanned in a progressive sweep in azimuth angle and in elevation angle. The sweep pattern may include a simple sweep with monotonically varying azimuth angle and elevation angle, or multiple interlaced sweeps. A full sweep of all sensing directions captures the entire scene. The sweep is then repeated to capture the next scene in time, and thus capture data elements representing a sequence of scenes in time. This allows capture of a dynamically changing scene. Alternatively, the sweep may encompass only a selected range of directions, so that the new information is captured only in certain directions. This can be used, for example, where moving objects of interest are present in only part of the scene.

The simple operations are performed to capture each data element, permit rapid capture of the entire scene, at a high pixel data rate limited only by the bandwidth of the interconnect and the rate at which the storage elements can accept data. The pixel data elements constituting each direction matrix may be captured in parallel, i.e., in series or in some combination of these approaches. The relationship between pixel sensing elements and locations in transform image 840 desirably remains fixed in time. That is, the connections between individual pixel sensing elements and individual locations in storage provided by interconnect element 830 may remain fixed either permanently or until commanded by an external control device (not shown). This in turn further facilitates rapid capture of data. The connections between pixel sensing elements and the storage devices in the interconnect element may be implemented as hardwired connections, typically in integrated circuit architectures such as applications specific integrated circuits ("ASICs") or in simple switching networks under control of a non-volatile memory or a continually-refreshed volatile memory.

As in the embodiments discussed above, the transform images may be subjected to data compression techniques so as to eliminate redundant data and reduce the amount of data which must be stored and handled. For example, individual direction matrices may be subjected to data compression techniques similar to those used with ordinary video images as, for example, run-length encoding to eliminate redundant copies of the same data reproduced in numerous identical locations. Alternatively or additionally, neighboring direction matrices may be compared with one another and only the differences between neighboring matrices may be stored. Also, successive transform images 840 representing successive scenes in time may be compared with one another and only the data representing the differences between transform images need be stored. These and other conventional data compression techniques may be employed. Compression techniques based on wavelet functions may also be employed. As in the embodiments discussed above, the transform images, and time sequences including numerous transform images or data sets defining a time sequence of scenes can be handled, stored, copied and transmitted using conventional digital techniques.

The stored pixel data elements constituting each multidimensional transform image 840 can serve as starting data elements for reconstruction of a virtual viewpoint image from any arbitrary virtual viewpoint. In a telepresence system, the virtual viewpoint image may have a viewpoint 858 inside locus 812 and a viewing direction 860 selected to match the viewing direction of an observer as, for example, by monitoring the observer's location and head movement in the manner discussed above. The system reconstructs virtual viewpoint image containing an array of synthetic pixels 862 lying in a image plane 864. Plane 864 is perpendicular to a viewing direction vector 860 through viewpoint 858. For each pixel 862, the system computes the direction of a synthetic pixel ray vector 866 from that synthetic pixel 862 through the virtual image viewpoint 858. The system also computes the intercept 868 of the synthetic pixel ray vector on locus 812 based on the location of viewpoint 858 and the synthetic direction of the pixel ray vector 866. The system then selects one or more of the starting pixel data elements associated with pixel ray vectors 814 having directions and intercepts close to the direction and intercept of the synthetic pixel ray vector and derives pixel data for the synthetic pixel from the selected starting pixel data element or elements.

In a particularly simple and rapid derivation scheme, the system simply selects the direction matrix having a common ray direction closest to the synthetic pixel ray vector direction. The system then selects the starting pixel data element in that direction matrix which is associated with a pixel ray vector 814 having an intercept 806 closest to the intercept 868 of the synthetic pixel ray vector 866. The system copies the selected starting pixel data element as the pixel data for the particular synthetic pixel. This process is repeated for all synthetic pixels in the virtual viewpoint image. In a variant of this process, a plurality of starting pixel data elements having pixel ray vector intercepts 806 close to the synthetic pixel ray vector intercept 868 are selected from the selected direction matrix and these plural data elements are combined to yield the synthetic pixel data. Also, the system can select a plurality of direction matrices having common ray directions close to the synthetic pixel ray direction and select one or more pixel data elements with close intercepts from each selected direction matrix. All of these pixel data elements can be combined to provide the synthetic pixel data.

Calculation of the synthetic pixel ray vector direction and intercept can be performed by simple geometry. However, the process can be accelerated by providing a look up table relating virtual viewpoint, virtual view direction and position of each pixel within a virtual viewpoint image to synthetic pixel ray vector direction and intercept. As in the systems discussed above, it is preferred to provide a stereoscopic pair of virtual viewpoint images so that the observer can perceive the scene in three dimensions. As the observer moves or turns within the observer's focus of reference, the virtual viewpoint and virtual view direction in the frame of reference of the scene and locus change. Thus, new virtual viewpoint images must be created. A sequence of scenes can be displayed to the observer, by substituting the transform image or set of starting pixel data elements representing new scenes, so that the observer sees the sequence of scenes in time. The system discussed above with reference to FIGS. 26 and 27 can be varied in numerous ways. For example, the various cameras 800 may be arranged so that the difference in azimuth angle between adjacent pixel sensing elements within each camera is equal for some or all of the pixel sensing elements in the various cameras. Thus, the azimuths of pixel ray vectors associated with different pixels in the image captured by each camera differ from one another by equal inter-pixel azimuth differences. The viewpoints of the cameras may be selected so that the offsets or differences in azimuth between some or all adjacent viewpoints are integral multiples of the inter-pixel azimuth differences. In this case, pixel ray vectors captured by several different cameras will have identical azimuth angles, subject only to physical inaccuracies in construction of the system. This simplifies the allocation of pixel data elements to direction matrices. Likewise, the cameras may be arranged so that the difference in elevation angle between adjacent pixel sensing elements within each camera is equal for some or all of the pixel sensing elements in the various cameras. In this case, the elevations of pixel ray vectors associated with different pixels in each image differ from one another by equal inter-pixel elevation differences. The differences or offsets between adjacent viewpoints in elevation can have magnitudes which are integral multiples of the inter-pixel elevation differences in each said discrete image. Thus, pixels in wherein a plurality of said discrete images will have the same elevation angle. Both of these approaches can be utilized together, so that pixel data elements captured by plural cameras will have identical elevation angles and azimuth angles, thus further simplifying allocation of the pixel data elements to direction matrices. This combined approach works best when the locus of the viewpoints is cylindrical rather than spherical.

In copying the pixel data from the pixel sensing elements into the direction matrices or other transform image, the system can treat a group of adjacent physical parts of the device as a single pixel sensing element, so that the data recorded represents a combination of the signals from all of these parts. For example, multiple photodiodes in a solid state sensor may be treated as a single large pixel sensing element. Also, in reconstructing the image, the determination of the synthetic pixel ray direction vector direction and intercept may be performed for a group of adjacent synthetic pixels, rather than once for every pixel. The adjacent synthetic pixels may be considered to have adjacent intercepts on the locus, and the same synthetic pixel ray direction.

In a further variant, the order of dimensions in the multidimensional transform image may be inverted. Thus, pixel data elements having identical or closely adjacent pixel ray vector intercepts may be assigned to a single intercept matrix, and the location of each pixel data element in each such intercept matrix may be assigned dependent on the direction of the pixel ray vector associated with each pixel data element.

As seen in FIG. 28, the pixel sensing elements can be provided by pixel sensing elements which are incorporated in cameras having viewpoints 806' which are not coincident with the locus 812' used as the basis for finding intercepts 870' of the various ray vectors 814'. All that is required is that the intercepts and direction vectors be calculable from the known geometry of the camera or other image capture device. Indeed, the pixel sensing elements need not be provided in the form of a camera having a viewpoint as such. For example, pixel sensing elements 802" (FIG. 29) are provided in an array sensor 872. Each pixel data element is associated with a collimating aperture 874 so that the particular sensing element is sensitive only to illumination falling on the array along a pixel ray vector 814". The pixel ray vectors associated with all of sensing elements 802" in array 872 are parallel to one another. Thus, at any instant, sensor array 872 acquires an entire direction matrix, including pixel data elements with pixels having ray vectors in a common direction and having different intercepts 806" on locus 812". Such a sensor may be physically moved by a mobile support element 876 through arcuate motion so as to alter the common ray vector direction and thus capture a plurality of direction matrices. As in the embodiments discussed above with reference to FIGS. 26 and 27, the common ray vector direction desirably is swept in a preselected pattern over the range of available ray vector directions.

The equivalent result can be achieved by providing a set of phased array sensors and adjusting the phased array sensors to accept radiation in different directions with time. In an array of phased array sensors, each sensor typically includes plural elements which cooperate to define the sensing direction. For example, several phased arrays may be operated in parallels so as to sense radiation impinging on all of the several phased arrays in parallel directions. Such phased array sensors may be used, for example, with radiation in the radio frequency (RF) range as, for example, in radar systems. Similar phased arrays can be provided in sonic and ultrasonic systems. Thus, as used in this disclosure, the term "illumination" should be understood as referring not only to visible light, but also to radiation and/or vibrational energy in essentially any wavelength which can be used to derive information about the surrounding scene.

It is not essential that the locus be spherical or constitute a part of a sphere. Thus, a locus 912 of arbitrary shape may be employed. Provided that the shape of the locus is known so that the intercept 906 of a synthetic pixel ray direction vector can be determined, and provided that the intercepts 906 of starting pixel ray vectors 914, and the directions thereof, can be determined in a common frame of reference, the system can operate in substantially the same manner as discussed above. Even in a locus of arbitrary configuration, position may be defined by longitude or azimuth 903 and latitude or elevation 905 of a position vector 907 relative to an index vector 909. The locus may be two-dimensional or one-dimensional, such as the circular locus discussed above in FIG. 1.

As pointed out above with respect to FIG. 29, and with respect to FIGS. 16–21, the system can move the pixel sensing elements to different locations during operation as, for example, by turning camera 400 (FIG. 16) to a different location at different times. Provided that the location and orientation of the camera or other device incorporating the pixel sensing elements is tracked at different times, the system can calculate the direction and intercept of the pixel ray vectors for pixel data captured at different times. Where the camera or sensor array is mounted on a moving device having a known and accurate path of movement, the location and orientation can be determined from the known parameters of the device. However, the location and orientation of a camera or other sensor array can also be determined by comparing the image or other set of pixel data acquired when the device is in an unknown position with the image or other set of pixel data derived when the device is in a known or starting position. For example, by comparing the locations of the same identifiable points in a scene in an image captured by a camera at an unknown location with the locations of the same points acquired when the camera is in a starting location, the transform between these images can be deduced, and hence the unknown camera location and orientation relative to the starting location can be deduced. Techniques for comparing images in this manner and for deducing camera location and orientation from such comparison are known per se. Here, however, the information is used to deduce viewpoint or ray vector intercepts and ray vector direction for use in the systems as discussed above. Using this approach, a camera can be moved in an arbitrary manner as, for example, where the camera is supported in a photographer's hand, and the resulting series of images can be used as starting pixel data for the systems as discussed above.

As mentioned above, the system can display a time sequence of telepresence scenes as, for example, in a real time display providing telepresence in a dynamic-ally changing environment. Scenes or sequences of scenes can be modified to provide effects such as fade from one scene or sequence of scenes to another, or fade from a sequence of different scenes to a constant scene, such as a uniform field of illumination, e.g., fade to black. These and many other forms of progressive alteration in a time sequence of telepresent scenes can be provided by appropriate modification of a data set defining the scene or sequence of scenes. For example, a sequence of transform images 840 (FIG. 26), each defining one scene in the first series of scenes can be modified by applying essentially any type of alteration to the elements constituting the series so that the alteration changes progressively. Likewise, a single data set defining a static scene can be modified in a fine-varying manner to provide a time-varying sequence of scenes which appears to change progressively.

For example, to provide a fade from a first series of scenes to a second, different series of scenes, each transform image in the first series may be combined with a transform image in the second series as, for example, by weighted addition of the data in corresponding pixel data elements from the two series. The weighting factor applied to the two series can be made to change progressively in time. The resulting, altered series contains a progressive fade from the first series to the second series. When the altered series is used to reconstruct virtual viewpoint images for an observer, the observer can still look in an arbitrary direction within each scene as the same is presented to him. However, the observer will perceive the scene changing gradually from the first series to the second series. In the foregoing example, the same weighted addition is performed with respect to all of the pixel data elements in each transform image, so that the fade is uniform in all portions of the scene. However, the alteration can be performed on less than all of the pixel data elements in each transform image. The number of altered pixel data elements can be varied progressively in the altered sequence. Preferably, the pixel data elements in each transform image are associated with pixel ray vectors having direction and intercept on a locus as discussed above and the particular pixel data elements which are altered at any point in the time series are selected according to an order which relates to the directions of the associated pixel ray vectors. In a progressive wipe, where a second series of scenes, or a field of uniform illumination starts to replace the first scene or series of scenes in a small region of the user's. field of view and this effect spreads progressively. To provide this effect, the system can replace the pixel data elements associated with pixel ray vectors in a small range of directions at the beginning of the process with the altered pixel data as, for example, the pixel data representing the second scene or series of scenes. The size of this range can be increased progressively. Multiple ranges of directions can be used to allow the effect to spread from multiple starting points at different portions of the user's field of view. In either case, the observer is gradually enveloped by the change. The transform images incorporating direction matrices as discussed above with reference to FIGS. 26 and 27 are particularly well-suited for this process. Thus, the step of altering the pixel data elements in the first scene or series may be performed by selecting those direction matrices which have a pixel ray vector or common direction within the specified range and altering all of the pixel data elements in the selected direction matrices. Where the alteration is performed in real time during image reconstruction, while an observer is viewing the scene or series of scenes, the alteration can be controlled with reference to the observer's disposition so as to provide the second scene or series of scenes in a predetermined orientation relative to the observer. As seen in FIG. 31, a first scene 920 includes a set of buildings. This series of scenes is recorded with reference to a reference vector 922 in the frame of reference of the scene. In the observer's frame of reference, this reference vector corresponds to vector 922'. If the observer has turned so as to look along a different vector 924' in his frame of reference, he will see the image corresponding to a line of sight along vector 924 in the frame of reference as the first series of scenes. Thus, at the time of transition, the observer is looking at the building with the sign "XYZ" in the first scene. As second series of scenes 926 was captured in a frame of reference having a reference vector 928. In the transition from the first scene to the second series of scenes, the relationship between the frame of reference of the second series of scenes and the observer's frame of reference may be selected so that the observer's view direction 930' corresponds to a preselected view direction 930 within the second series of scenes. Stated another way, the vector in the observer's frame of reference 928' corresponding to the reference vector of the second series of scenes is selected to achieve the desired correspondence at the start of the second series. In the example shown, when the view transitions from the first scene to the second series, the observer will always be looking along vector 930 in the second series of scenes and hence will be looking directly into the tunnel 933 which appears along that vector in the second series. This allows the producer of telepresence scenes to achieve particular artistic effects. In effect, the system overcomes the user's free choice of viewing direction and forces the user to begin with a preselected viewing direction when the new series of scenes starts. In still other effects, the relationship between the reference vector of a scene or series of scenes may be altered continually that the observer perceives himself as spinning within the scene, in multiple directions.

Other types of alteration can also be applied in telepresence display. For example, the output image or images displayed to the observer may be altered by techniques such as those commonly used to alter television images in common digital video effects equipment. Thus, the output image may be caused to seemingly spin around the user's viewing axis, giving the user the illusion of spinning in space. Alternatively, two sequences of telepresence scenes can be combined by computing two separate output images for the user's viewpoint and combining these output images into a single output image, using the techniques commonly used to combine television images with one another. Conversely, the image may be altered when the same is first captured. For example, the pixel data constituting an image captured by any camera or series of cameras in the embodiment of FIG. 26, or in any of the other embodiments discussed above utilizing cameras, can be scrambled or blacked out so as to blur or black out a portion of the scene.

Figure 32:
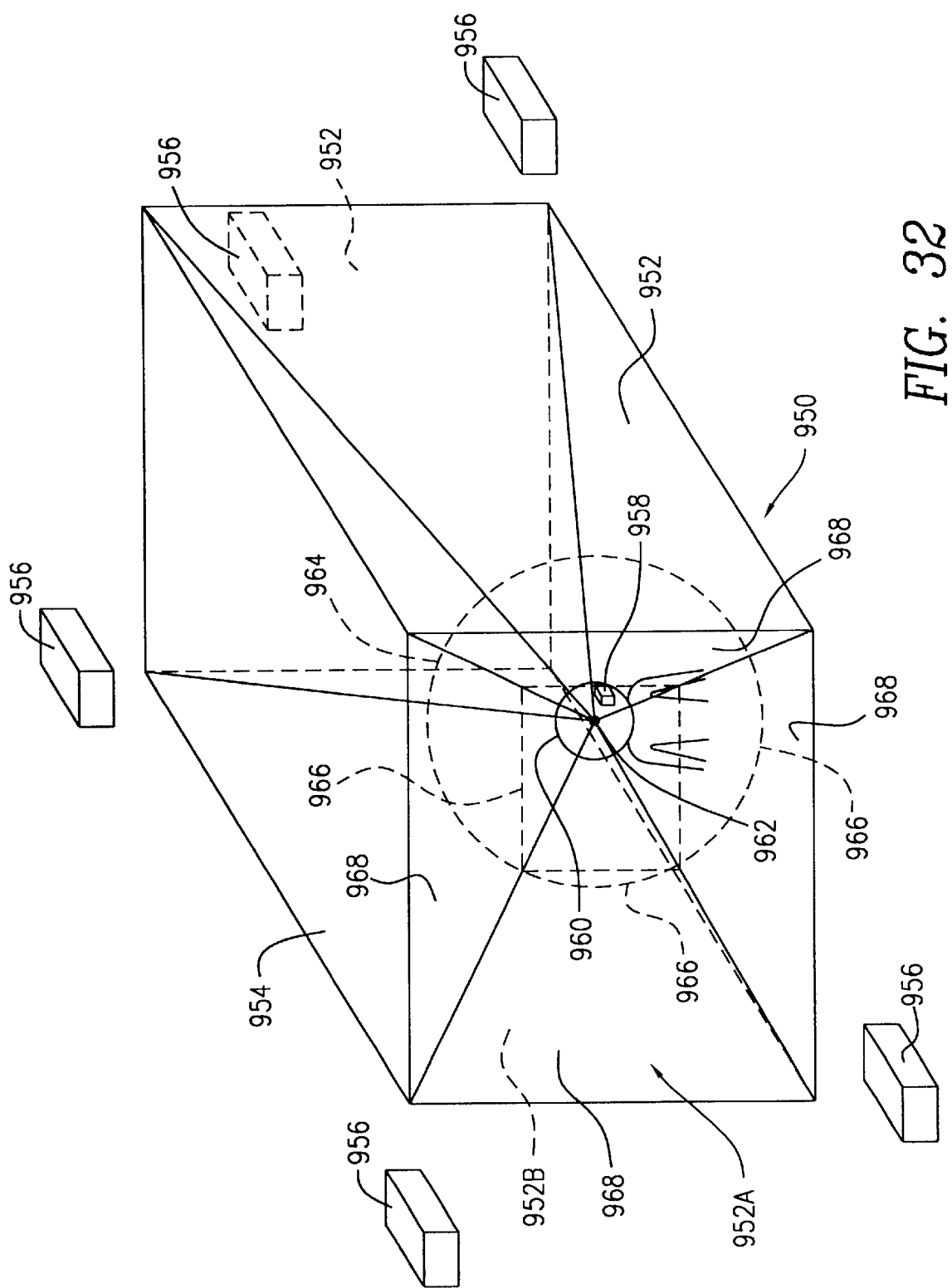
FIG. 32 is a diagrammatic perspective view depicting apparatus used in a method according to yet another embodiment of the invention.

The systems discussed above can be utilized with a display device of the type commonly known as a "cave". A cave includes an enclosure 950 having surfaces such as walls 952 and a ceiling 954 with viewing screens thereon and having conventional display devices as, for example, projection television units 956 arranged to project television images onto each of the surfaces so that the same are visible to an observer disposed inside of enclosure 950. Here again, the system includes conventional devices, such as magnetic orientation device 958 for detecting at least the position of the observer's head 960 and thus determining the observer's viewpoint. The system can synthesize the entire spherical image which the user would see if he could see in all directions from his viewpoint 962. The spherical view is subdivided into regions which the observer would see on each of the surfaces. Thus, the spherical view is assumed to lie on the surface of an imaginary sphere surrounding the user's viewpoint 962. The spherical view is subdivided into view frustums. Each frustum has boundaries corresponding to the intersection of the imaginary sphere 964 with the planes of a pyramidal frustum formed by surfaces extending from the corners of each real surface 952 of the cave to the user's viewpoint. For example, one such view frustum has boundaries 966 corresponding to the intersection of imaginary sphere 964 with planes 968 extending between the point 962 and the corners of surface 952A, facing toward the viewer in FIG. 32. Thus, the boundaries of each frustum may be calculated from the user's position and the known geometry of the cave surfaces. That portion of the spherical view lying within each frustum is mapped to a planar image and provided to the projector 956 associated with the corresponding surface. For example, that portion of the spherical view lying within boundaries 966 is projected on surface 952A. In this manner, the telepresence scenes are displayed on the wall of the cave in such a way that the observer, looking at the wall of the cave in any direction sees the same image as he would see if he were looking into the spherical image from his point of view. As the observer cannot see through a full 360° arc, the system need not project on all of the surfaces simultaneously. If the system detects the observer's orientation as well as his location, the system can omit those portions of the spherical image which would lie to the rear of the observer.

The system may be expanded to provide stereo viewing. Thus, different viewpoints are selected for the user's two eyes, in the manner discussed above with reference to FIG. 3. Spherical images and frustums are generated for each of these two viewpoints. This will result in two images projected onto each surface 952 and 954 of the cave. These images are separated from one another, so that the correct image is perceived by the correct eye of the user, and is not perceived by the other eye of the user. For example, the user may be provided with polarized glasses and each image may be projected with the corresponding polarity. Alternatively, the user may be provided with goggles having electronic shutters which repeatedly cycle open and close so that the user can see out of only one eye at a time. Display of the different images can be synchronized with operation of the goggles in known manner. The combination of telepresence, achieved through the systems discussed above, together with the comfortable and realistic viewing experience afforded by the cave display provides a particularly enhanced experience to the observer.

The system may be arranged to capture images having a field of view wider than the virtual viewpoint images to be displayed. Thus, as illustrated in FIG. 10, each line 184 may incorporate P pixels, representing the full field of view, whereas the image to be displayed may require only a smaller number of pixels indicated by image line 250, representing a smaller field of view. This leaves M' excess pixels at each end of the line 184. For a normal, unskewed image, line 250 contains the pixels from the central portion of line 184. However, for a skewed image, line 250 can be reconstituted to start closer to one end or the other end of line 184. In this instance, the pixels at the ends of the line are taken from the same line 184, i.e., from an image with the correct viewpoint. If the degree of skew exceeds that which can be accommodated by M' pixels, then supplementary pixels from adjacent lines are used.

Numerous variations and combinations of the features discussed above can be utilized. The interpolation scheme used to derive an interpolated line in the epipolar image (FIGS. 6 and 9) can differ from the pixel-by-pixel interpolation scheme described. Various schemes for detecting edges and boundaries of objects in video images are well-known in the processing of conventional, two-dimensional video images. Any of these schemes can be applied to each line set of the epipolar image. For example, in FIG. 6 the edges of strip 110' can be detected directly. Once such edges have been detected, the same can be used to assign pixel values in the interpolated line; the pixel values can be calculated from the closest pixel values on the same side of the edge, while disregarding pixel values on the opposite side of the edge.

Figure 15:
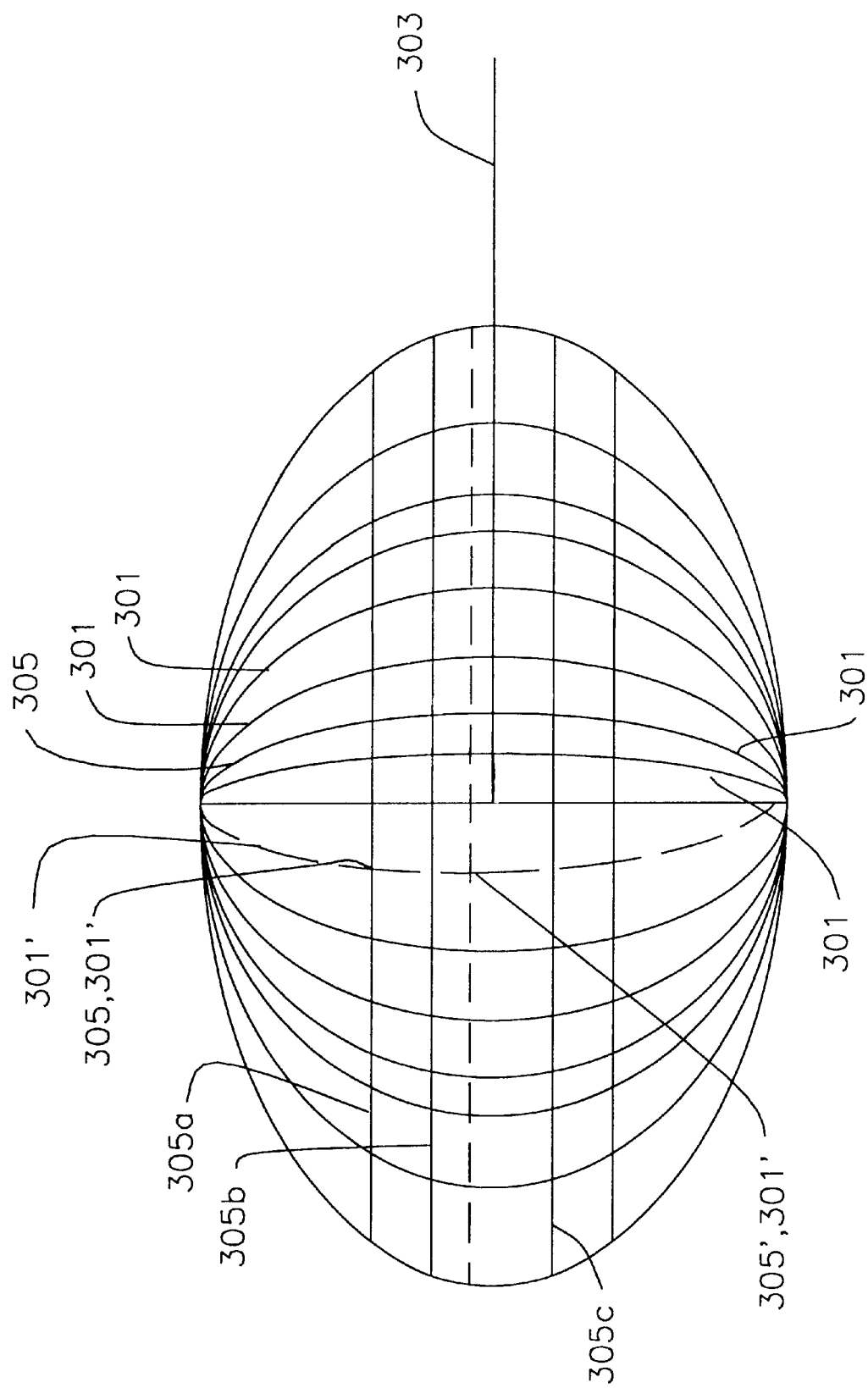
FIG. 15 is a diagrammatic view depicting a further embodiment of the system.

The system discussed above with reference to FIGS. 1–14 utilizes a planar, circular, discrete viewpoint locus. It assumes that the observer is looking in a single horizontal plane. It does not provide corrections for tilt of the observer's head. However, the invention is not limited in this manner. In a further extension of the system, the discrete images can be provided as a spherical image array as discussed above with reference to FIGS. 24 and 25 or as illustrated in FIG. 15. Using the system as described above with reference to FIGS. 1–14, the discrete images may be taken as radial images at intersections of meridians 301 and latitude lines 305 of a sphere. The discrete images taken on any latitude line 305 of the sphere can be treated in substantially the same way as the images on the circular locus discussed above. Thus, the system can derive a virtual image representing the image at latitude line 305 and on an arbitrary longitude line 301' intermediate between the longitude line 301 of the discrete images using substantially the same methods as described above. In the same manner, the system can derive virtual images for numerous locations along longitude line 301' by independently treating the data for the images on the various latitude lines as, for example, the various discrete images on line 305a at its intersection with line 301 and the discrete images on line 305c at its intersection with the various latitude lines 301. Thus, the system derives a set of virtual images which can be treated as a set of discrete images at various locations on the virtual meridian 301'. The system can then process these images to derive a virtual viewpoint image at any arbitrary location 305', 301' or 301' in the same manner as the system described above derive images on the circular locus. Likewise, the system can derive a virtual viewpoint image for any arbitrary point within the spherical locus, on the plane of virtual meridian 301' in the same manner as the system described above derives virtual viewpoint images for arbitrary locations within the circular locus. However, this approach requires considerably more effort than the methods described with reference to FIGS. 24 through 27.

In the systems discussed above, the camera locus is curvilinear, the discrete images represent viewpoints looking outwardly from within the locus and the virtual viewpoints are inside of the locus. However, the virtual viewpoints may be disposed outside of the camera locus. For example, the system discussed above can accommodate a virtual viewpoint location outside of the locus, with the view axis pointing outwardly, away from the locus. In the embodiments of FIGS. 10–14, the base view would be taken as the view immediately behind the outwardly looking virtual viewpoint, and would be modified to map less than all of the pixels in the base view line of the epipolar line set into the entire virtual image line. However, where the virtual viewpoints are far from the discrete viewpoint locus, and where the same are substantially skewed, the virtual viewpoints can require information which is simply not present in the originally-captured data. For example, a viewpoint far outside of the image locus, with the viewer looking inwardly toward the locus, will require information as to the color and brightness of the back sides of objects which have their front sides facing towards the locus.

In certain systems described above, the virtual image synthesis apparatus determines the required mapping by calculations performed in real time as the observer's position changes. However, operation of the system can be considerably expedited by providing a look-up table listing the pixel mappings to be performed for each position of the observer. Moreover, in the systems discussed above, the virtual image synthesis unit derives the two virtual images for each observer independently. However, because the observer's interpupillary distance is fixed, there is a fixed relationship between the two points of view of the observer. Stated another way, the view point of the virtual image to be presented through one display unit 140 of a given observer bears a fixed relationship to the viewpoint of the image to be presented through the other display unit 138 for the same observer. Thus, the pixel mappings required to form the image for display 140 will bear a determinable relationship to the pixel mappings required for the display unit 138.

Various techniques can be employed to reduce the processing load involved in generating the images. First, where the scene to be portrayed includes static elements, the static and moving elements can be segregated. For example, the contents of one frame can be subtracted from the contents of the next succeeding frame to form image including only the changed portions. The static elements can be segregated from the moving elements by well-known image processing techniques. A transform image including all of the static elements can be captured once. Separate transform images consisting only of the moving elements can be constructed from the images by the real cameras. For example, the static environment can be captured in one series of transform images whereas a real moving object as, for example, an actor in a scene, can be captured in another series of transform images including real pixel data only for the desired object and a artificial information, such as a deep blue background color, for the remainder of the pixels. The transform images including the changing data can be merged with the transform image representing the static background by the conventional technique of "chroma keying". In this technique, the background image is combined with the moving by checking the chroma or color reflected in the pixel data of the changing image. Wherever the chroma indicates the artificial background color such as dark blue, the second image is disregarded and the pixel data is taken entirely from the first image. Conversely, wherever the second image includes pixel data indicating a different color, the pixel data is taken entirely from the second image. This technique is applied routinely in processing of ordinary video images, and can be applied to the transform images in the same manner.

Although the foregoing discussion has centered on images of real scenes captured by real cameras, the same techniques can be applied to mathematically generated images. For example, a computer can be actuated to generate the various discrete images of a mathematically constructed scene, and the resulting pixel data can be processed in exactly the same way as the real image pixel data discussed above. Also, an transform image representing a real scene can be merged with a transform image representing a computer generated object or objects.

EXAMPLE 1

Figure 16:
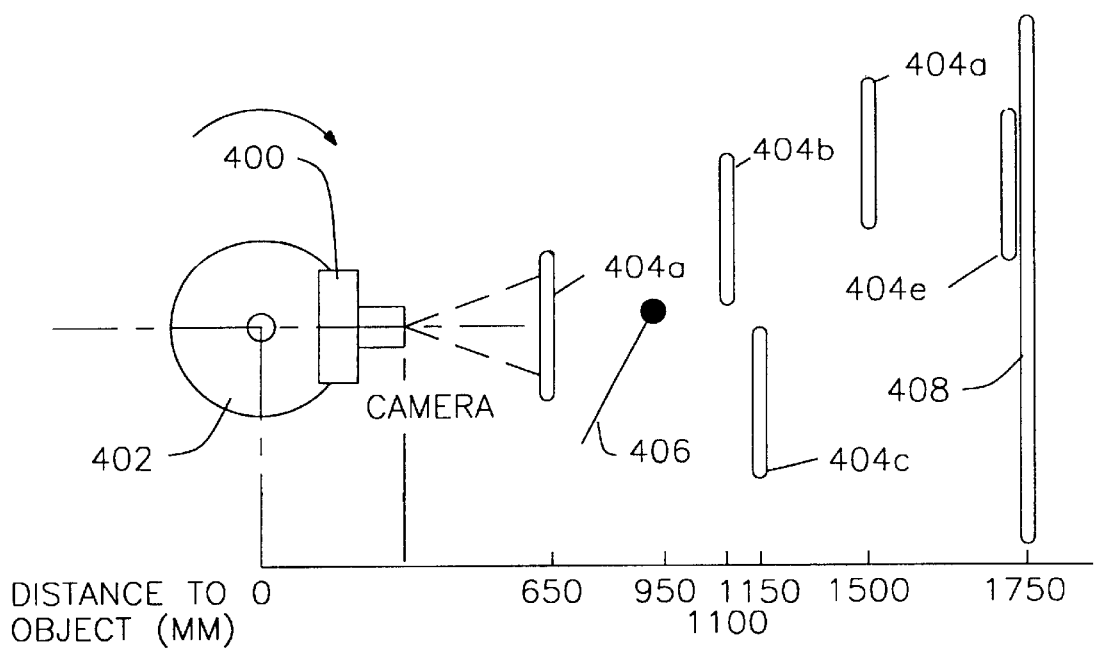
FIG. 16 is a diagrammatic top view depicting certain structures utilized in a practical test of certain aspects of the invention.
Figure 17A:
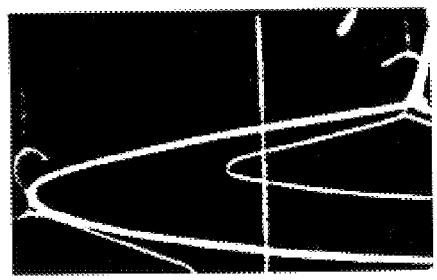
FIGS. 17a, 17b and 17c are actual photographic images as initially captured with the equipment of FIG. 14.
Figure 17B:
Figure 17C:

Certain aspects of the present invention are illustrated by the following non-limiting example. As illustrated in FIG. 16, a video camera 400 is positioned on a turntable 402 so that the camera points radially outwardly from the center of the turntable and so that the lens of the camera lies at a radius of 250 mm from the turntable center. The camera and turntable are positioned on a flat horizontal surface. Several ordinary coat hangers 404 are arranged vertically above the surface. A string 406 extends vertically. All of these elements are positioned in front of a dark, vertical backdrop 408 at a distance of 1750 mm from the turntable center. The distance to each object from the turntable center is indicated by the scale at the bottom in FIG. 16. Camera 400 has a field view of 27 degrees from edge-to-edge, or 13.5 degrees on either side of the view center line. The turntable is actuated to turn in one degree steps. At each step of the turntable, while the turntable is stopped, camera 400 captures a video image. The camera thus captures discrete images at 1 degree increment. FIG. 17a is the 31st discrete image; FIG. 17b is the 32nd discrete image and FIG. 17c is the 33rd discrete image. The effect of camera rotation and parallax can be seen in these images. See, for example, the image of hanger 404b disappearing from the left-hand edge in FIGS. 17b and 17c, and the change in the apparent relative position between the two hangers at the top of the image.

Figure 18:
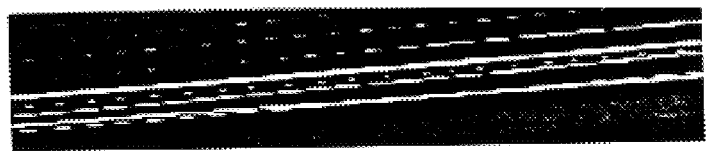
FIG. 18 is a depiction of line set generated from the images captured by the apparatus of FIG. 14.
Figure 19:
FIG. 19 is a depicting of the line set of FIG. 16 after modification.

FIG. 18 illustrates one line set from an initial epipolar image reconstituted from the images captured by the camera. FIG. 19 shows the same line set after application of an offset as discussed above with reference to FIG. 6.

Figure 20:
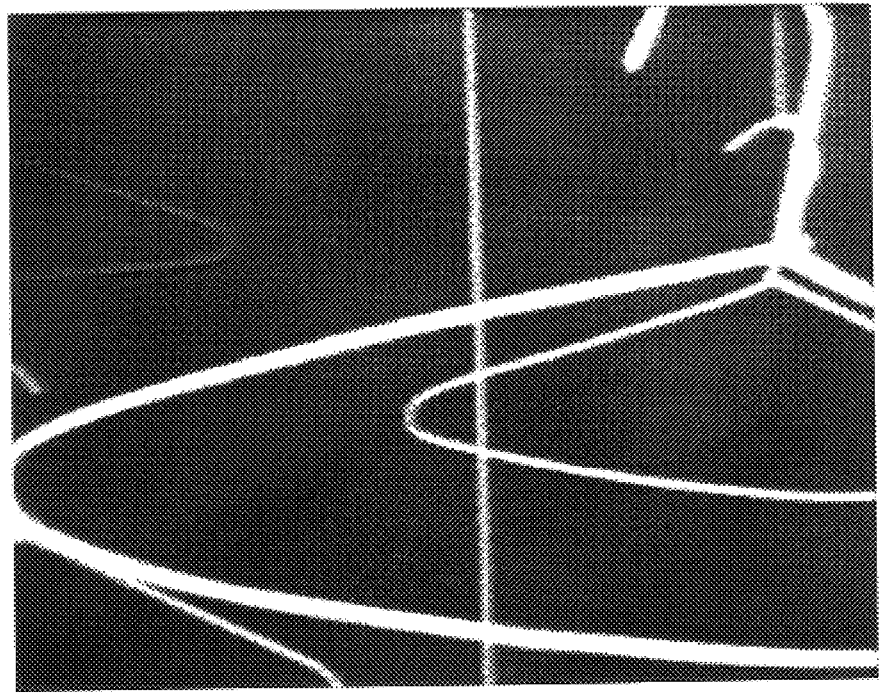
FIG. 20 is an actual image captured at one position of the apparatus of FIG. 14.
Figure 21:
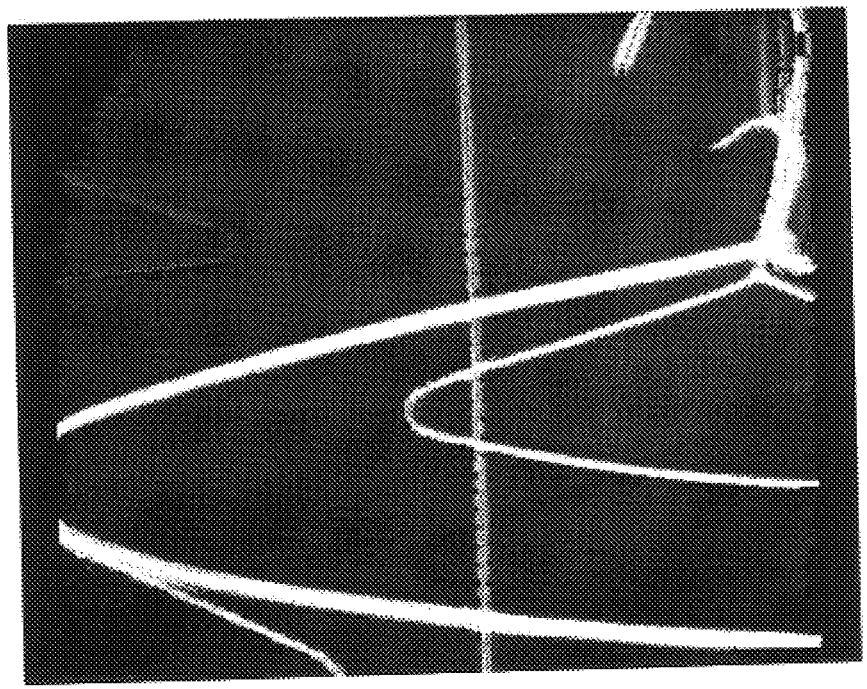
FIG. 21 is a synthesized image, derived from other images captured by the same apparatus, to depict the image which would be captured from the same viewpoint as FIG. 20.

FIG. 20 is an enlarged version of the 32nd image as captured and as also illustrate in FIG. 17b. FIG. 21 shows a virtual image generated by interpolation between the discrete images of FIGS. 17a and 17c. That is, each line in the image of FIG. 21 was derived by interpolation in a line set from the epipolar image, as if the discrete 32nd image did not exist. The image is truncated at its edges. Nonetheless, it is apparent from comparison of FIGS. 20 and 21 that the scene has been portrayed with good accuracy in the virtual image.

As these and other variations and combinations of the features discussed above can be utilized with departing from the present invention, the foregoing description of the preferred embodiment should be taken by way of illustration rather than by way of limitation of the invention as defined by the claims.

What is claimed is:

1. A method of synthesizing an image of a scene corresponding to the image of said scene which would be observed from a virtual viewpoint location, the method comprising the steps of:
   (a) providing a plurality of starting pixel data elements, each said starting pixel data element incorporating data corresponding to illumination seen along a starting pixel ray vector associated with that starting pixel data element, each said starting pixel ray vector having a direction and an intercept on a locus;
   (b) for each pixel of said synthesized image:
      (1) determining the direction and intercept on said locus of a synthetic pixel ray vector from such pixel through said virtual viewpoint location;
      (2) selecting one or more starting pixel data elements associated with starting pixel ray vectors having directions and intercepts close to the direction and intercept of the synthetic pixel ray vector; and
      (3) deriving synthetic pixel data for the pixel of the synthesized image from the starting pixel data of the selected starting pixel data elements.

2. A method as claimed in claim 1 wherein said step of deriving said synthetic pixel data includes the step of interpolating between the starting pixel data of the selected starting pixel data elements.

3. A method as claimed in claim 1 wherein said step of providing said starting pixel data elements includes the step of providing a plurality of direction matrices, each said direction matrix including pixel data elements associated with pixel ray vectors having directions parallel within a preselected direction tolerance range to a common direction, said step of selecting one or more starting pixel data elements for each synthetic pixel including the steps of selecting one or more of said direction matrices having a common direction close to the direction of the synthetic pixel ray vector for the synthetic pixel and selecting pixel data elements from the selected direction matrices associated with starting pixel ray vectors having intercepts within a preselected intercept tolerance of the intercept of the synthetic pixel ray vector on the locus.

4. A method as claimed in claim 1 wherein said step of providing said starting pixel data elements includes the step of ordering said starting pixel data elements in a multidimensional matrix having at least one dimension correlated with direction of the starting pixel ray vectors and at least one dimension correlated with the intercepts of said starting pixel ray vectors.

5. A method as claimed in claim 4 wherein said locus is two-dimensional and said matrix has two dimensions corresponding to the locations of the intercepts in the two dimensions of said locus.

6. A method as claimed in claim 1 wherein the step of providing said starting pixel data elements includes the step of providing a plurality of discrete two dimensional images corresponding to the image of a scene observed from a plurality of discrete viewpoints lying on said locus, each said discrete image including pixel data elements associated with pixels offset from one another in horizontal and vertical directions within said discrete image, the pixel data element associated with each pixel in a discrete image representing illumination seen along a starting pixel ray vector from that pixel through the viewpoint of that discrete image.

7. A method as claimed in claim 6 wherein said locus has azimuth and elevation directions wherein said discrete viewpoints are offset from one another in azimuth and elevation directions on said locus, such differences in azimuth and elevation corresponding to representing components of differences in direction between viewpoint location vectors from an origin to said viewpoints, the horizontal and vertical directions within each discrete image being parallel to said azimuth and elevation directions along said locus.

8. A method as claimed in claim 7 wherein the azimuths of pixel ray vectors associated with different pixels of each discrete image differ from one another by equal inter-pixel azimuth differences and wherein said offsets between said viewpoints in azimuth have magnitudes which are integral multiples of the inter-pixel azimuth differences in each said discrete image.

9. A method as claimed in claim 7 wherein the elevations of pixel ray vectors associated with the pixels of each discrete image differ from one another by equal inter-pixel elevation differences and wherein said offsets between said viewpoints in elevation have magnitudes which are integral multiples of the inter-pixel elevation differences in each said discrete image.

10. A method as claimed in claim 9 wherein said step of providing said starting pixel data elements includes the step of providing a plurality of direction matrices, each said direction matrix including pixel data elements associated with pixel ray vectors extending parallel to one another in a common direction but taken from a plurality of said discrete images, said step of selecting one or more starting pixel data elements for each synthetic pixel including the steps of selecting one or more of said direction matrices having a common direction close to the direction of the synthetic pixel ray vector for the synthetic pixel and selecting pixel data elements from the selected direction matrices taken from discrete images having viewpoints close to the intercept of the synthetic pixel ray vector on the locus.

11. A method as claimed in claim 6 wherein said locus is all or a portion of a sphere, said origin is the center of the sphere, each said discrete image has a viewpoint direction perpendicular to the horizontal and vertical directions of such image and extending through the viewpoint of such image on said locus, said viewpoint directions being substantially radial with respect to said sphere or portion of a sphere.

* * * * *

UNITED STATES PATENT AND TRADEMARK OFFICE
CERTIFICATE OF CORRECTION

PATENT NO.    : 6,327,381 B1
DATED         : December 4, 2001
INVENTOR(S)   : Peter Rogina, Michael Ehrlich and David Macintosh It is certified that error appears in the above-identified patent and that said Letters Patent is hereby corrected as shown below:

<u>Title page,</u>
Item [75], Inventors, "(GB)" should read -- (Scotland) --.

Item [57], ABSTRACT,
Line 3, "on an" should read -- on a --.

<u>Column 1,</u>
Line 57, "observers two" should read -- observer's two --.

<u>Column 2,</u>
Line 44, "turn, is" should read -- turn, are --.

<u>Column 3,</u>
Line 29, "invention provide" should read -- invention provides --.

<u>Column 5,</u>
Line 42, "or there-" should read -- or three- --.
Line 55, "real cameras" should read -- real camera --.
Line 61, "at. a given instant" should read -- at a given instant. --
Line 66, "may instead may" should read -- instead may --.

<u>Column 6,</u>
Line 9, "such as a transform" should read -- such as transform --.
Line 20, "to may spread" should read -- to spread --.
Line 39, "images, such, and" should read -- images, and --.
Line 50, "with embodiment" should read -- with an embodiment --.

<u>Column 13,</u>
Line 40, "data is in" should read -- data are in --.
Line 47, "date is received" should read -- date are received --.

<u>Column 14,</u>
Line 9, "reference, defines a" should read -- reference, define a --.

<u>Column 15,</u>
Line 45, "dimension F increase" should read -- dimension F increases --.

UNITED STATES PATENT AND TRADEMARK OFFICE
CERTIFICATE OF CORRECTION

PATENT NO.    : 6,327,381 B1
DATED         : December 4, 2001
INVENTOR(S)   : Peter Rogina, Michael Ehrlich and David Macintosh It is certified that error appears in the above-identified patent and that said Letters Patent is hereby corrected as shown below:

Column 22,
Line 62, "images is converted" should read -- image is converted --.

Column 26,
Line 37, "merely pixel sensing copies" should read -- merely copies --.
Line 58, "so on. pixel sensing Stated" should read -- so on. Stated --.

Column 27,
Line 65, "lying in a image" should read -- lying in an image --.

Column 29,
Line 6, "wherein a plurality" should read -- in a plurality --.

Column 36,
Line 24, "also illustrate in" should read -- also illustrated in --.

Column 37,
Line 27, "two dimensional" should read -- two-dimensional --.

Signed and Sealed this

Twenty-seventh Day of August, 2002

*Attest:*

JAMES E. ROGAN
*Attesting Officer*   *Director of the United States Patent and Trademark Office*